(12) United States Patent
Weatherall et al.

(10) Patent No.: US 7,378,849 B2
(45) Date of Patent: May 27, 2008

(54) METHOD AND APPARATUS FOR OBTAINING SPATIAL INFORMATION AND MEASURING THE DIELECTRIC CONSTANT OF AN OBJECT

(75) Inventors: James C. Weatherall, Linwood, NJ (US); Joseph A. Gatto, Deptford, NJ (US)

(73) Assignee: SRA International, Inc., Fairfax, VA (US)

( * ) Notice: Subject to any disclaimer, the term of this patent is extended or adjusted under 35 U.S.C. 154(b) by 0 days.

(21) Appl. No.: 10/681,032

(22) Filed: Oct. 7, 2003

(65) Prior Publication Data

US 2005/0073310 A1    Apr. 7, 2005

(51) Int. Cl.
*G01V 3/00* (2006.01)
(52) U.S. Cl. ........................ 324/321; 324/418
(58) Field of Classification Search ............. 324/321, 324/319, 318, 309, 307, 300–322; 600/412, 600/427, 410; 250/341
See application file for complete search history.

(56) References Cited

U.S. PATENT DOCUMENTS

| | | | |
|---|---|---|---|
| 3,437,914 A * | 4/1969 | Lantz et al. ............... | 324/303 |
| 3,589,177 A | 6/1971 | Merlo | |
| 3,722,288 A | 3/1973 | Weber | |
| 4,087,798 A | 5/1978 | Thorn et al. | |
| 4,234,844 A | 11/1980 | Yukl | |
| 4,263,511 A | 4/1981 | Hirschberg | |
| 4,267,620 A * | 5/1981 | Allen, Jr. ............... | 19/239 |
| 4,370,611 A | 1/1983 | Gregory et al. | |
| 4,433,286 A | 2/1984 | Capots et al. | |
| 4,493,039 A | 1/1985 | Gregory | |
| 4,651,100 A | 3/1987 | Janes | |
| 4,652,829 A | 3/1987 | Safinya | |
| 4,740,753 A | 4/1988 | Glover et al. | |
| 4,881,025 A | 11/1989 | Gregory | |
| 4,912,982 A | 4/1990 | Yukl | |
| 5,124,662 A | 6/1992 | Downing et al. | |
| 5,260,665 A | 11/1993 | Goldberg et al. | |
| 5,263,482 A * | 11/1993 | Leunbach ............... | 600/412 |
| 5,266,913 A | 11/1993 | Chapman | |
| 5,296,810 A | 3/1994 | Morich | |
| 5,334,941 A | 8/1994 | King | |
| 5,341,100 A | 8/1994 | Taylor | |
| 5,648,038 A | 7/1997 | Fathi et al. | |

(Continued)

OTHER PUBLICATIONS

Norbert Geng and Lawrence Carin, "On the Low Frequency Natural Response of Conducting and Permeable Targets," IEEE Transactions on Cecoscience and Remote Sensing, vol. 37, No. 1, Jan. 1999, pp. 347-359.

(Continued)

*Primary Examiner*—Brij B. Shrivastav
(74) *Attorney, Agent, or Firm*—Roberts Mlotkowski & Hobbes

(57) ABSTRACT

Methods and apparatus are provided for obtaining spatial information about an object, and for measuring the dielectric constant of an object. They include placing the object in a cavity and interacting electromagnetic radiation at a plurality of frequencies with the object to obtain a corresponding plurality of measured resonant transverse magnetic modes. They also include using the plurality of measured resonant transverse magnetic modes to obtain the spatial information for the object, and/or using the plurality of measured resonant transverse magnetic modes to obtain the dielectric constant for the object.

26 Claims, 10 Drawing Sheets

U.S. PATENT DOCUMENTS

| | | | |
|---|---|---|---|
| 5,689,189 A | 11/1997 | Morich et al. | |
| 5,757,187 A | 5/1998 | Wollin | |
| 6,049,207 A | 4/2000 | Petropoulos | |
| 6,081,118 A | 6/2000 | Kaplan | |
| 6,194,898 B1 * | 2/2001 | Magnuson et al. | 324/300 |
| 6,255,816 B1 | 7/2001 | Robitaille | |
| 6,255,824 B1 | 7/2001 | Barbara | |
| 6,375,875 B1 | 4/2002 | Paulauskas et al. | |
| 6,522,910 B1 * | 2/2003 | Gregory | 600/427 |
| 6,774,634 B2 * | 8/2004 | Cosman | 324/321 |
| 6,828,558 B1 * | 12/2004 | Arnone et al. | 250/341.1 |
| 2002/0005725 A1 | 1/2002 | Scott | |
| 2002/0149377 A1 | 10/2002 | Hefti et al. | |

OTHER PUBLICATIONS

Brett D. Cuthbertson et al., "Sensitivity and Optimization of a High-Q Snyphire Dielectvie Motion-Sensar Transducer," IEEE Transactions on Ultrasonics, Ferroelectrics and Frequency Control, vol. 45, No. 5, Sep. 1998, pp. 1303-1313.

* cited by examiner

Tm011

Tm020

Tm010

Tm012

METHOD AND APPARATUS FOR OBTAINING SPATIAL INFORMATION AND MEASURING THE DIELECTRIC CONSTANT OF AN OBJECT

GOVERNMENT INTEREST

This invention was made with Government support under contract DTFA03-01-F-20103, awarded by the Federal Aviation Administration, Department of Transportation. The Government has certain rights in the invention.

BACKGROUND OF THE INVENTION

1. Field of the Invention

The present invention relates to apparatus and methods for sensing objects and, more specifically, to apparatus and methods for sensing objects based on their electrical permittivity or dielectric constant to obtain information about the object or its contents, such as its composition, construction, spatial characteristics and/or the like.

2. Description of the Related Art

There are many applications in which it is necessary or desirable to determine information about an unknown object, or to confirm information about an object, such as its composition, construction, spatial characteristics, and the like. This is particularly true for field applications, for example, such as at airports, public buildings, and the like, where security interests dictate that certain dangerous or potentially dangerous objects, such as weapons, explosives, etc. be detected and precluded. Interest in devices and methods for obtaining such information has increased recently, with the increased risk of terrorism and hostile acts in public places. Such devices also can be useful in detecting contraband, quality control in manufacturing, and in diagnostic medical imaging.

Devices commonly known as metal detectors are in widespread use for detecting metal objects. Metal detectors operate by radiating a low-frequency electromagnetic field, typically having an operating frequency of a few hundred Hertz ("Hz") to a few tens of thousands of Hertz. The low-frequency magnetic fields associated with the radiated energy interact with metal objects by inducing currents on the surface of the object for reasonably good conductors, and by magnetizing the permeable ferrous materials for objects comprising ferrous components. In either case, these mechanisms produce secondary magnetic fields that can be detected in a complimentary fashion by the antenna of the metal detector device producing the primary field.

Metal detectors have been limited, for example, in their general inability to sense non-metallic objects, or objects that have relatively low magnetic permeability. In metal detectors, the physical properties that are being detected are electrical resistivity and/or magnetic permeability. Objects that have high electrical resistivity and low magnetic permeability, such as those with a high dielectric constants, accordingly do not lend themselves to satisfactory detection with metal detector-type devices.

Dielectric detection is another approach to sensing objects. In known dielectric detection devices and methods, the radiating device includes an antenna radiating electric dipole radiation, typically in the ultra high frequency ("UHF") and super high frequency ("SHF") radio wave region or the microwave region, e.g., in the hundreds of megahertz ("MHz") to tens of gigahertz ("GHz") range. Non-magnetic objects interact with this type of radiation by undergoing charge separation in the polarizable components. In this dielectric approach, the physical property of the material that is being detected by the electrical signal is the electrical permittivity or the dielectric value.

Known dielectric radio frequency ("RF") detection devices also have been limited in a number of respects. One limitation lies in the ambiguity associated with varying sizes and shapes of the objects being measured. Existing dielectric RF detection devices operate by measuring the change in impedance of the antenna when the object is inserted into its near field. Ambiguities are caused by the fact that the size and shape of the object affect the overall impedance measured at the antenna. Such systems often are incapable of distinguishing, for example, between objects of the same size but having different dielectric constants, and objects of the same composition, and thus dielectric constant, but of different sizes and/or shapes.

Approaches have been suggested in which the frequency of the radiation used in the detection is varied, and the results are correlated with frequency changes of known dielectric samples. These approaches, however, have been ineffective in satisfactorily addressing this limitation.

Another limitation with known dielectric detection methods and apparatus lies in their sensitivity and reliability in making accurate measurements, and thus in their ability to distinguish one material from another.

OBJECTS OF THE INVENTION

Accordingly, an object of the present invention is to provide apparatus and methods that are useful in evaluating objects of unknown composition, or in confirming composition.

Another object of the invention according to certain of its aspects is to provide apparatus and methods that are useful for measuring or distinguishing the dielectric constant of an object.

Another object of the invention according to certain of its aspects is to provide a method and apparatus for obtaining spatial information about an object.

Another object of the invention according to certain aspects of the invention is to provide apparatus and methods that are useful for assessing the composition of an object while taking into account spatial considerations such as the size and/or shape of the object.

Another object of the invention is to provide methods and apparatus that are useful in quickly assessing spatial information and/or dielectric constant information about an object, for example, suitably for field applications.

An additional object of the invention is to provide methods and apparatus for assessing spatial information and/or dielectric constant information about an object non-destructively.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a method is provided for obtaining spatial information about an object. The method comprises interacting electromagnetic radiation at a plurality of frequencies with the object to obtain a corresponding plurality of measured resonant transverse magnetic ("TM") modes, and using the plurality of measured resonant TM modes to obtain the spatial information for the object.

The method preferably comprises using the plurality of measured resonant TM modes to obtain spatial information about positions of the measured TM modes, and using the spatial information about the positions of the measured TM modes to obtain the spatial information about the object. The use of the plurality of measured resonant TM modes to obtain spatial information about positions of the measured TM modes may comprise using a Fourier Bessel transform approach, and/or using parameters relating to the object, although others may be used as well.

In accordance with another aspect of the invention, a method is provided for obtaining spatial information about an object. This method comprises providing a cavity for containing the object, positioning the object in the cavity, interacting electromagnetic radiation at a plurality of frequencies with the object to obtain a corresponding plurality of measured resonant TM modes in the cavity, and using the plurality of measured resonant TM modes to obtain the spatial information for the object. In this method, it is preferred that the interacting of the electromagnetic radiation at a plurality of frequencies with the object to obtain a corresponding plurality of measured resonant TM modes in the cavity comprises, for each of the frequencies, measuring a frequency shift relative to a base frequency.

In accordance with another aspect of the invention, a method is provided for measuring the dielectric constant of an object. The method comprises interacting electromagnetic radiation at a plurality of frequencies with the object to obtain a corresponding plurality of measured resonant TM modes, and using the plurality of measured resonant TM modes to obtain the dielectric constant for the object. The electromagnetic radiation at a given one of the plurality of frequencies normally will comprise one of a set of base frequencies. In preferred implementations of this method, each of the plurality of measured resonant TM modes of the set of measured resonant TM modes corresponding to the given one of the plurality of frequencies comprises a frequency shift relative to the base frequencies.

In accordance with still another aspect of the invention, a method is provided for measuring the dielectric constant of an object. The method comprises interacting electromagnetic radiation at a plurality of frequencies with the object to obtain a corresponding plurality of measured resonant TM modes. Each of the measured resonant TM modes comprises dielectric constant information and spatial information relating to the object. The method further comprises using the plurality of measured resonant TM modes to obtain the spatial information, and using the plurality of measured resonant TM modes and the spatial information to obtain the dielectric constant information and the dielectric constant for the object.

In preferred implementations of this method, the obtaining of the plurality of measured resonant TM modes comprises obtaining $TM_{0np}$ modes, wherein n and p assume ascending integer values. Preferably at least the first four of the ascending $TM_{0np}$ modes are used. For example, it is desirable to include the TM010, TM020 and TM030 modes in order to discriminate the radial extent of the object, and at least the TM011 mode in order to discriminate the axial extent of the object. The method preferably comprises measuring a frequency shift corresponding to a difference between a base frequency and each of the measured resonant TM modes. When obtaining spatial information according to preferred implementations of the method, the methods preferably comprise obtaining a position for each of the measured resonant TM modes, and correlating the position of the measured resonant TM mode with the spatial position of the object. This may be implemented using a Fourier-Bessel construction method to obtain the spatial position of the object, and/or a parameter matching method, both of which are described in greater detail below.

In accordance with another aspect of the invention, a method is provided for measuring the dielectric constant of an object. This method comprises positioning the object in a cavity, interacting electromagnetic radiation at a plurality of frequencies with the object to obtain a corresponding plurality of measured resonant TM modes, using the plurality of measured resonant TM modes to obtain the spatial information, and using the plurality of measured resonant TM modes and the spatial information to obtain the dielectric constant information and the dielectric constant for the object.

In accordance with yet another aspect of the invention, an apparatus is provided for obtaining spatial information relating to an object. The apparatus comprises a cavity having a size and a shape sufficient to physically accommodate the object, an antenna system for directing electromagnetic radiation comprising a plurality of frequencies into the cavity, and for receiving a corresponding plurality of measured resonant TM modes, and a signal processor operatively coupled to the antenna system for processing the measured resonant TM modes to obtain the spatial information relating to the object.

In accordance with another aspect of the invention, an apparatus is provided for measuring the dielectric constant of an object. The apparatus comprises a cavity having a size and a shape sufficient to physically accommodate the object, an antenna system for directing electromagnetic radiation comprising a plurality of frequencies into the cavity, and for receiving a corresponding plurality of measured resonant TM modes, and a signal processor operatively coupled to the antenna system for processing the measured resonant TM modes to obtain the dielectric constant for the object.

In the apparatus according to these aspects of the invention, the cavity may assume a number of different geometries, but in the presently preferred embodiments is substantially cylindrical in shape. Preferably, the ratio of the cavity height h to its radius r is selected to cause the resonant frequencies to be distinct from one another. Preferred ratios are in the range of about 0.3 to about 2.7, more preferably the ratio is about 0.3 to about 0.4, and even more preferably about 0.34 or about 1.25.

The antenna system preferably is configured to receive the corresponding plurality of measured resonant TM modes at the cavity axis, which for cylindrical cavities corresponds with the cylinder axis. The antenna system may comprise a single antenna used for both irradiating the object and receiving the signal within the cavity during interaction with the object, i.e., while the object is in the cavity and under analysis. The antenna system also may comprise multiple antennas, for example, segregated into one or more radiating elements and one or more receiving elements. Again, at least one of the receiving antennas preferably is disposed on or collinearly with the cavity axis.

In the presently preferred embodiments and methods, the antenna system is positioned with respect to the cavity to receive azimuthally symmetric ones of the plurality of measured resonant TM modes, and the signal processor comprises circuitry for processing the azimuthally symmetric ones of the plurality of measured resonant TM modes. The signal processor preferably comprises circuitry for processing a first set of the sequential ones of the measured resonant TM modes for measuring the dielectric constant value, wherein the first set of measured resonant TM modes comprises a lowest range of the sequential ones of the measured resonant TM modes. At least the first four TM modes preferably are used, and more preferably the first seven TM modes.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention. Of the drawings.

DETAILED DESCRIPTION OF THE PREFERRED EMBODIMENTS AND METHODS

Figure 1:
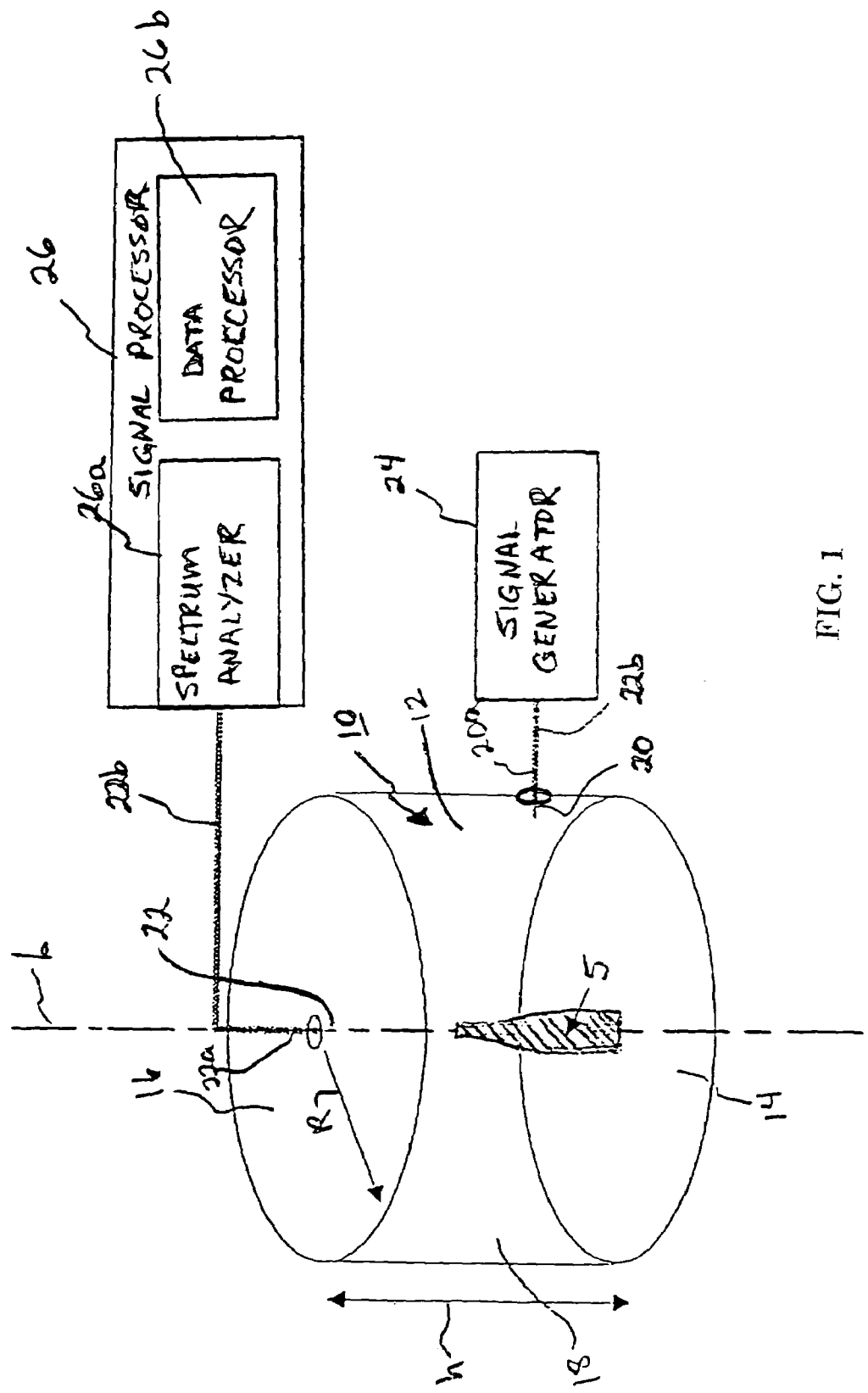
FIG. 1 is a perspective view of a detection system according to a presently preferred embodiment of the invention.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

The present invention in its presently preferred embodiments and implementations can be useful in screening materials by dielectric detection. The utility of this capability is significant. Typical requirements for a dielectric detection device, for example, would be to distinguish between the dielectric constants of commonly encountered objects and compositions, depending of course on the application. The scope of this task can be illustrated by Table 1, which shows dielectric constants for selected materials. As shown by this data, apparatus and methods that are capable of detecting and distinguishing dielectric constant values within a few units would have great utility. They could, for example, easily distinguish among gasoline, alcohols, and water.

TABLE 1

Dielectric Constant of Selected Materials

| Material | Dielectric Constant ε |
|---|---|
| AIR | 1.000536 |
| KEROSENE | 1.8 |
| GASOLINE | 2 |
| PARAFFIN WAX | 2.1–2.5 |
| VASELINE | 2.2–2.9 |
| SUGAR | 3 |
| OLIVE OIL | 3.1 |
| HYDROCHLORIC ACID | 4.6 |
| NITROCELLULOSE | 6.2–7.5 |
| AMMONIA | 16.5 |
| ISOPROPYL ALCOHOL | 18.3 |
| NITROGLYCERIN | 19 |
| ACETONE | 20.7 |
| NITRIC ACID | 50 |
| HYDROGEN PEROXIDE 100% | 70.7 |
| WATER | 80 |

The term "object" is used herein to refer to the specimen to be examined using the methods and apparatus according to the invention. It refers broadly to any object (item, container, material, etc.) for which one wishes to obtain spatial and/or dielectric constant information. The object may be a homogeneous or heterogeneous material. The object may be unknown as to its construction, composition, or the like, or where the construction, composition, etc. is believed to be known, but confirmation or authenticity is desired. The present invention and its preferred embodiments and implementations are best suited for use with non-metallic objects. Examples would include bottles or similar containers that contain liquids such as those listed in Table 1. The present invention and its preferred embodiments and methods are particularly well suited for sensing and/or evaluating such objects as items that transportation passengers, such as airline patrons, may wish to carry on a transportation vehicle. Objects for which the invention and its embodiments are useful to sense also may include human or animal anatomical components. The term "object" or "dielectric object" as used herein below in the description of the presently preferred embodiments and methods is assumed here to be comprised of a dielectric material, at least in the sense that it is not a pure conductor, and therefore has a reasonably measurable dielectric constant. Measurement as the term is used herein is used according to its common meaning in the applicable technical field, and includes estimating or obtaining information from which determinations or estimates of the underlying quantity, e.g., dielectric constant ∈, may be made.

Although not wishing to be limited to any particular principle or theory, stated broadly, the problem of ambiguities in the measurement of dielectric constant associated with object size and shape can be limited or overcome if one has, or can measure, or can infer, spatial information about the object. In these instances, the dielectric constant measurement can be normalized for these size and shape parameters, to thereby yield a truer measurement or estimate of dielectric constant, largely independent of these size and shape variables. This can be accomplished, as described more fully herein below, by using TM modes to measure or infer spatial information, and using this spatial information to appropriately adjust the measured value of the dielectric constant. One can infer the position, and thus the size and shape, of the object by correlating this physical position with the position of various and selected TM modes.

In accordance with one aspect of the invention, an apparatus is provided for obtaining spatial information relating to an object. In accordance with a separate but related aspect of the invention, an apparatus is provided for measuring the dielectric constant of an object. A system 10 according to a first preferred embodiment of these aspects of the invention is shown in FIG. 1, and will now be described.

In accordance with this aspect of the invention, the apparatus comprises a cavity having a size and a shape sufficient to physically accommodate the object. By stating that the cavity is of sufficient size and shape to physically accommodate the object, this means that the cavity is sufficient to house or expose a sufficient amount of the object to electromagnetic radiation to obtain the measurements as described herein. It does not necessarily mean that the cavity must fully physically contain the entire object, as will be apparent from the subsequent description herein below. The cavity preferably is constructed of an electrically conductive material, such as steel or aluminum, and thus may be considered an electromagnetic cavity. It preferably is cylindrical or substantially so, but may assume other geometric or volumetric shapes, e.g., such as cubic, rectangular, and others.

As implemented in the preferred embodiment of FIG. 1, system 10 includes a cavity 12, having a bottom face 14, a top face 16, and a cylinder wall 18. A cavity axis L is assumed to lie along the cylinder axis. It represents a mathematical construct to aid in the illustration of system 10 and its operation. Base or bottom face 14 and top face 16 lie in planes parallel to one another, and each is orthogonal with respect to axis L. Top face 16 may be removable or otherwise may be opened for insertion and removal of an object 5 to be analyzed.

As noted above, cavity 12 has a size and shape sufficient to physically house objects sought to be measured using system 10. In this preferred but merely illustrative embodiment, cavity 12 has a height h measured from the axial location on base 14 to the axial location on top face 16, and a radius R measured along base 14, top face 16, or any plane within the cylinder parallel to base 14 or top face 16. The height of cavity 12 is 60 centimeters (cm), and the internal diameter 2R is 96 cm. These dimensions were selected to accommodate a wine bottle-sized container (object).

The relative shape of the cavity can have an impact on the capabilities and performance of system 10. The ratio of the height h to the radius R of a cylindrical cavity, for example, can be selected to cause the resonant frequencies to be distinct from one another, or to be relatively more distinct to facilitate their accurate measurement. The ratio of the height h to the radius R for a cylindrical cavity preferably is about 0.4 to about 2.7, more preferably is about 0.3 to 0.4, and more preferably about 0.34, or about 1.25. In the preferred embodiment of FIG. 1, the ratio is 1.25. As will be appreciated, steps should be taken to ensure that cavity 12 is as fully enclosed as is reasonably possible with conductive material to avoid unwanted energy leakage.

The basic design parameters of cavity 12 were determined from the theory of resonant cavities together with computer simulations. Some applications and embodiments favor a large cavity of right-circular cylindrical geometry. This geometry is desirable for computer modeling and data analysis. The design of the presently preferred embodiments also makes use of the fact that signal detection with an axially-aligned antenna can eliminate modes that do not have azimuthal symmetry. This allows one to concentrate on optimizing the design for the interaction of the radial and axial components of the electric field with the object.

A number of considerations may be relevant to the determination of the overall cavity size. In one approach, the cavity is sized to be sufficiently large to entirely enclose the largest of the objects anticipated to be measured with the system, e.g., a wine bottle. In this instance, the cavity should have sufficient height to accommodate complete immersion in the applied electromagnetic field with some axial clearance at the top to diminish end effects from the container in the field. An average wine bottle is about 30 cm in height. From this the cavity height should be at least 40 cm. The internal radius can be established by scaling radius to height. The height h=60 cm and internal radius R=48 cm, with the ratio h/R=1.25 in the preferred embodiment, system 10, were chosen for several reasons. First, for lower modes, only certain h/R ratios, such as h/R=2.7, 1.72, and 1.57, work well to separate the TM-zero modes in frequency, thus avoiding ambiguity in the identification of modes. In particular, to keep the TM021 and TM020 modes well separated, it is necessary or desirable to have h/R<2. In addition, as the dielectric constant ∈ increases from 1 to 20, the TM02$p$ mode frequencies can change faster than TM01$p$ modes for particular values of mode numbers p. Therefore, to guard against reversing the ordering of the modes in frequency, which could confuse identification, the TM020 mode frequency preferably should be lower in frequency than the TM012 mode frequency in the empty cavity. This occurs for system 10 when h/R<1.27. Furthermore, it is desirable to keep the perturbation of electromagnetic fields small in order to avoid a nonlinear coupling between the internal modes of the dielectric-filled container and the cavity. Simulations have shown that linearity through values of ∈ less than 25 requires a scale size about 50 percent larger than the minimum height of 40 cm.

In accordance with this aspect of the invention, the apparatus also includes an antenna system for directing electromagnetic radiation comprising a plurality of frequencies into the cavity, and for receiving a corresponding plurality of measured resonant TM modes. The antenna system may comprise separate radiating and receiving antenna subsystems, or they may be combined, e.g., a single antenna structure may function as both the transmitting and receiving antenna. The antenna system preferably comprises an antenna design, and positioning with the cavity, to appropriately receive the resonant TM modes as identified or described herein. This preferably includes an antenna system that has receive capability collinear with or coincident with the axis of the cavity. For non-cylindrical cavities, the antenna system might normally be placed on an axis of symmetry, or any other position which might facilitate the measurement of selected cavity modes.

In system 10, the antenna system comprises a radiating element 20 and a receiving element 22. Radiating element 20 is disposed in the cylinder wall (side wall) 18 of cavity 12, and receiving element 22 is disposed in top face 16 at or substantially at the cylindrical axis L. Radiating element 20 comprises a 1.5 cm coaxial magnetic-loop type antenna extending into cavity 12 in a plane perpendicular to base 14 and top face 16, and along a line (a radiating element axis 20a) that intersects cavity axis L. The receiver antenna in this embodiment is a 1.5 cm long coaxial electric-stub type, terminated by a 3 cm disk.

The specific design of the antennas is not necessarily limiting, provided the appropriate fields can be generated within the cavity. In an alternative embodiment, for example, the radiating antenna 20 is an electric-stub wire antenna mounted in the top or bottom face of the cavity.

As implemented in system 10, radiating element 20 is coupled via a feed line 20b to a signal generator 24. The signal generator may be of essentially any construction that is capable of providing an electromagnetic signal into cavity 12 having appropriate frequency, stability, and power to irradiate the object and to provide the resulting signal, including signal strength, at receiving element 22. The specific requirements of signal generator, however, of course will depend upon the specific application, for example, such as the given cavity design, the types of objects to be analyzed, etc. In system 10, signal generator 24 comprises a source of harmonic radio frequency band signal that can be tuned or swept in frequency between 150 kHz and 1.35 GHz. Known or commercially available signal generators operable at the frequencies referred to herein generally would be suitable.

Receiving antenna 22 comprises a linear electric-stub wire type antenna or disk-terminated electric stub antenna that extends into cavity 12 collinearly with cavity axis L along a receiving element axis 22a. Positioning the receiving antenna at and along the cavity axis L allows it to receive the plurality of measured resonant TM modes at the cavity axis, a point that will be discussed further herein below. With this configuration, the radiating element axis 20a is located substantially orthogonally with respect to the receiving element axis 22a.

Further in accordance with this aspect of the invention, the apparatus comprises a signal processor operatively coupled to the antenna system for processing the measured resonant TM modes to obtain the spatial information relating to the object. In accordance with the apparatus for measuring the dielectric constant, the apparatus also comprises a signal processor operatively coupled to the antenna system for processing the measured resonant TM modes to obtain the dielectric constant for the object. As will be described more fully herein below, preferably a single signal processor is used as part of an integrated apparatus that both provides the spatial information and measures the dielectric constant for the object.

The signal processor may comprise any device that is capable of receiving the electromagnetic energy injected into the cavity by the signal generator, and which is capable of receiving the TM modes as described herein. It should be noted, however, that the operational frequency range and spectral resolution of the system are important. The frequency range should include the resonant frequencies of at least four of the lowest frequency TM modes. For example, in the first preferred embodiment (system 10), the frequencies of the TM010, TM011, TM020, and TM030 modes are 239, 346, 549, and 861 MHz, respectively. The reason for this to provide sufficient or desired information for the spatial analysis and solution of the inverse problem. The frequency resolution should be sufficient to accurately measure how the amplitude of the resonant signal varies with frequency, i.e. the line shape, in order to determine the center frequency of the resonance and determine frequency shifts. The breadth of the line depends on the construction of the cavity, and more particularly on energy loses due to absorption in the cavity walls. For cavity 12, a frequency resolution of about 100 kHz or 300 kHz is adequate for the applications specifically described herein.

This signal processor according to the presently preferred embodiments comprises a spectrum analyzer for measuring the amplitude of the signal within the cavity as a function of frequency, and which preferably is capable of selectively receiving the TM modes. The signal processor also preferably comprises a data processor, such as a microprocessor or appropriately programmed general-purpose computer, for carrying out the processing as further described herein below.

As implemented in system 10, a signal processor 26 is provided that comprises a spectrum analyzer 26a and a data processor 26b. Spectrum analyzer 26a of this illustrative embodiment comprises a Rhode and Schwarz FSP3 spectrum analyzer with an internal tracking generator, commercially available from Rhode and Schwarz, Munich, Germany and Columbia, Md. (USA). Preferably and significantly, the spectrum analyzer 26a should be capable of measuring signal output voltage amplitude and phase as a function of frequency. Although in this embodiment we measure only the signal output voltage amplitude, the signal output phase provides additional information which may be useful to characterize the object, such as its conductivity.

The data processor 26b in this illustrative embodiment comprises a general-purpose computer that suitably interfaces with spectrum analyzer 26a to receive the data output from the analyzer 26a. It includes a microprocessor, storage, associated circuitry and bussing for performing the processing as described herein. It includes commercially available spreadsheet software, into which spectral data from spectrum analyzer 26a can be loaded and manipulated or analyzed.

System 10 as herein described may be used to practice the presently preferred implementations of the methods for obtaining spatial information and dielectric constant for an object according to related aspects of the invention. It will be appreciated, however, that these preferred methods are not necessarily limited to this specific hardware configuration or the details of its operation as described here.

In operation, the detection process begins by placing an object 5 in cavity 12, preferably at or near the center of the cavity, on base 14. Cavity 12 is then closed. Signal generator 24 is then activated to cause antenna 20 direct electromagnetic radiation into cavity 12. This electromagnetic energy interacts with the object to alter the properties of the radiation relative to those within the cavity under the same conditions except when the cavity is empty.

The manner of irradiating the object will vary depending on the specific application. Preferably, the electromagnetic radiation used to irradiate the object ranges in frequency from about 150 MHz to about 1.35 GHz. The radiation may be applied by applying discrete steps in frequency as a function of time, or by sweeping the frequency across the desired range. In the preferred embodiments, the frequency is swept from 150 MHz to about 1.35 GHz. As a practical matter, in these embodiments the frequency is swept, but in narrow band steps, thus creating frequency-based bins of data. Alternatively, the electromagnetic radiation used to irradiate the object could include multiple frequency components, or even in essence a simultaneous barrage of frequencies, e.g., noise, and frequency selection can be undertaking at the receiving section, for example, by filtering or through frequency selecting at the spectrum analyzer. The resulting field is collected at receiving element 22 and communicated to spectrum analyzer 26a in bins, or selective frequency bandwidths. In this embodiment approximately 4,000 to 12,000 such bins are used.

The electromagnetic energy injected into the cavity by radiating element 20 interacts with the object, as described herein. At certain frequencies or frequency ranges (e.g., bins), the injected radiation interacts with the cavity, or the combination of the object and the cavity, to create resonant TE and TM modes. It is the TM modes that are of principal interest here.

Spectral information regarding these TM modes is segregated by spectrum analyzer 26a, and the data, preferably but optionally in digital form, is communicated to data processor 26b, where it is temporarily stored in or on an electronic or other storage medium such as an internal hard drive or floppy disk for subsequent analysis in a spreadsheet program, such as Microsoft EXCEL™, or other suitable software program. Spectral information regarding the TM modes is extracted at signal processor 26, and the TM0$np$ mode is communicated to the signal processor 26. This information is used by processor 26 as will be described herein below.

Individual TM cavity modes are identified with indices, m, n, and p—for example, TMmnp—where m corresponds to variations of fields in the azimuthal coordinate, n corresponds to the number of radial nodes in the axial (electric) field, and the final index, p, is the number of half-period variations in the axial dependence of the fields. When the parameter m=0, it corresponds to no variation of fields in the azimuthal coordinate. System 10 is designed to operate in the TM0$np$ modes, i.e., modes with only an azimuthal circulation of magnetic field. The electric field has both radial and axial components. Because system 10 has azimuthal symmetry, it utilizes only the m=0 modes. Other designs for which the internal object is not symmetric may utilize other types of modes, including TM modes with azimuthal variation, or TE modes.

Figure 2:
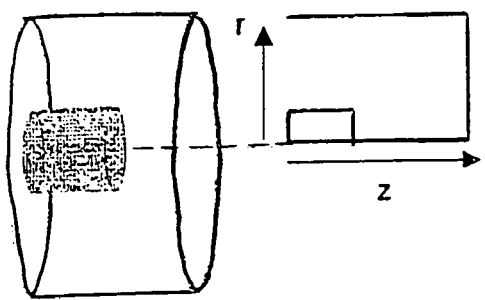
FIG. 2 shows a simulation the relationship between the cavity of the embodiment shown in FIG. 1 with a simulation of that cavity.
Figure 3:
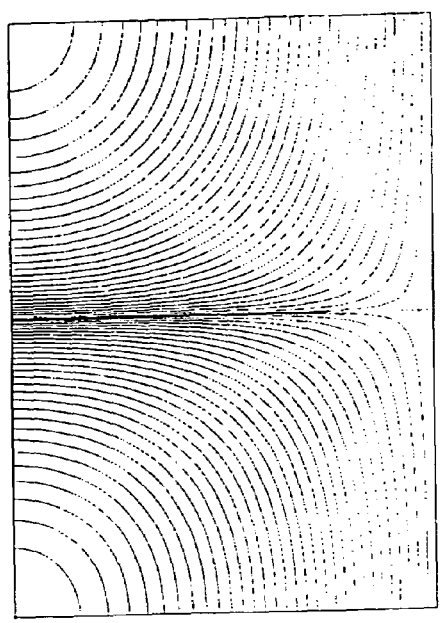
FIG. 3 shows a computed magnetic field for the four TM modes having the lowest frequency for the simulated detection device of FIG. 2.
Figure 3:
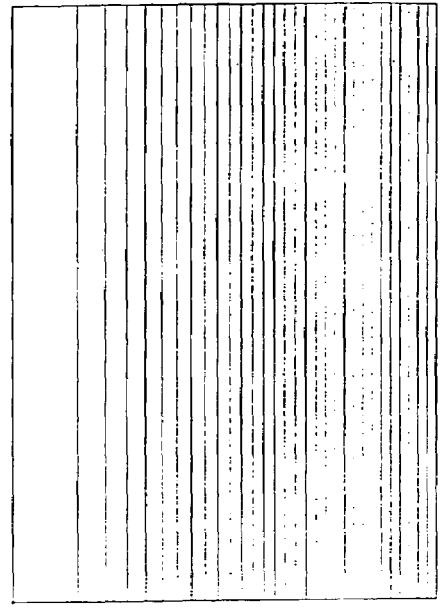
Figure 3:
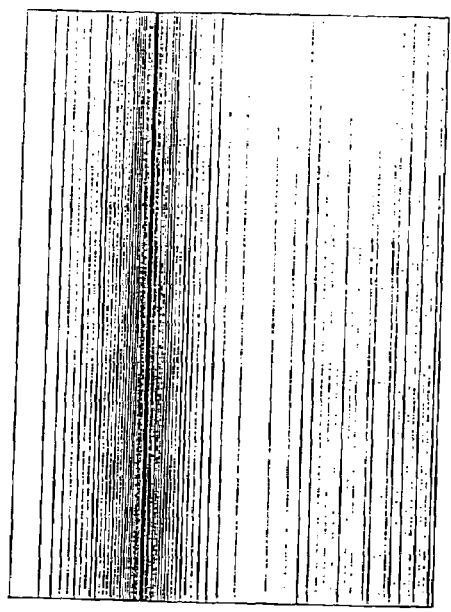
Figure 3:
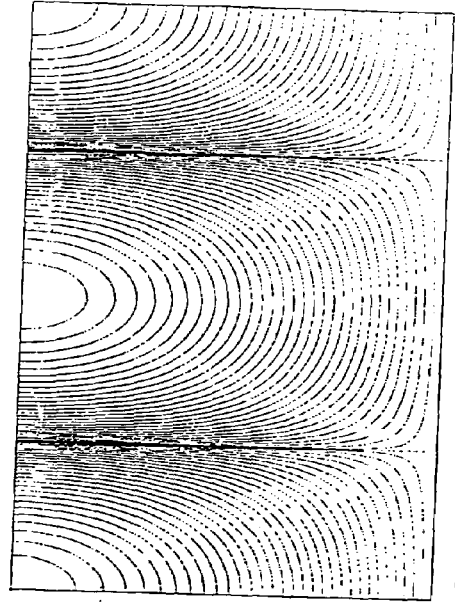

To further illustrate the operation of the presently preferred methods and preferred embodiment system 10, a simulation of the fields within cavity 12 has been made. For these calculation of fields, a computer program entitled SUPERFISH (a field-solving code maintained by the Los Alamos Accelerator Code Group, LAACG, Holsinger, R. F., Halback, K, Young, L. M, and Billen, J. H., (May 1, 2002) LAACG Software—Poisson/Superfish [WWW document] URL http://laacg1.lanl.gov/laacg/services/possup.html.) was used. FIG. 2 shows how the simulation volume relates to the cavity geometry in FIG. 1. The two-dimensional simulation volume depicts a cross-section of the cavity, where the bottom, horizontal axis coincides with the central axis of the cylindrical cavity, and the left, vertical axis coincides with the bottom of the cylindrical cavity. Rotation about the horizontal axis generates the three-dimensional volume. The electric and magnetic fields were computed for the four TM modes of lowest frequency, e.g., TM010, TM011, TM020, and TM012. They are shown in the empty cavity in FIG. 3, in clockwise order from the upper left. Contours represent regions of equal values of r×H, where H is the azimuthal component of the magnetic field, and r is the radial coordinate. These contours generally follow the lines-of-force for the electric displacement field, D.

The lowest resonant frequency of the $TM_{010}$ mode is 2.405 c/R, where c represents the speed of light in a vacuum, i.e., $3 \times 10^{10}$ cm per second, and R is the internal radius of cavity 12. In this design, the seven lowest frequency, zero-m, TM modes, which include $TM_{010}$, $TM_{011}$, $TM_{020}$, $TM_{012}$, $TM_{021}$, $TM_{022}$, $TM_{030}$, range in frequency from 239 to 861 MHz. If a larger range of operation is desirable for the purpose of spatial resolution, there are hundreds of modes with frequencies less than 2,000 MHz.

Figure 4:
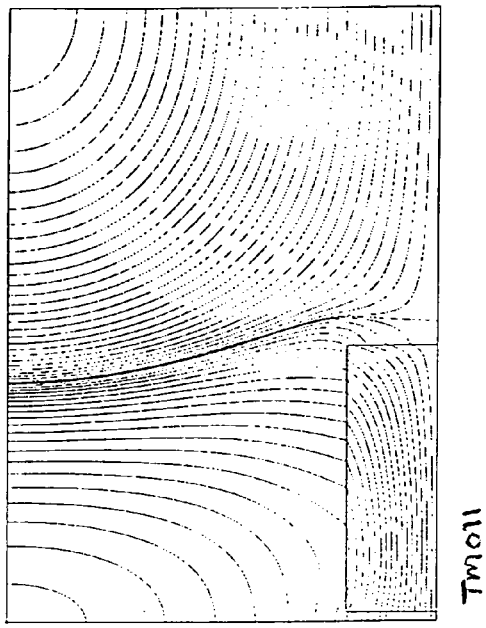
FIG. 4 illustrates the change in structure of the resonant modes of the TM modes caused by the introduction of a particular object in the detection device of FIG. 1.
Figure 4:
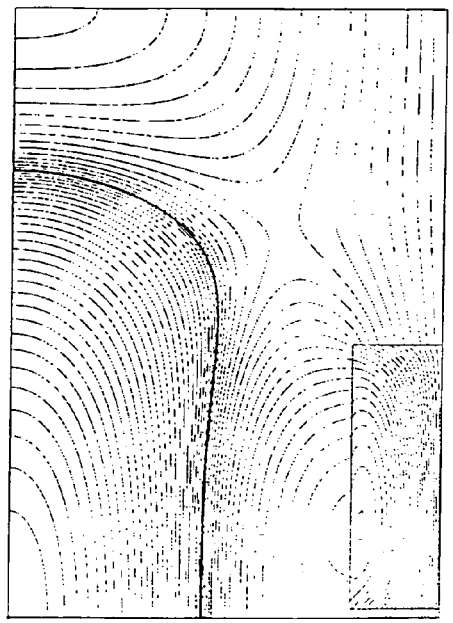
Figure 4:
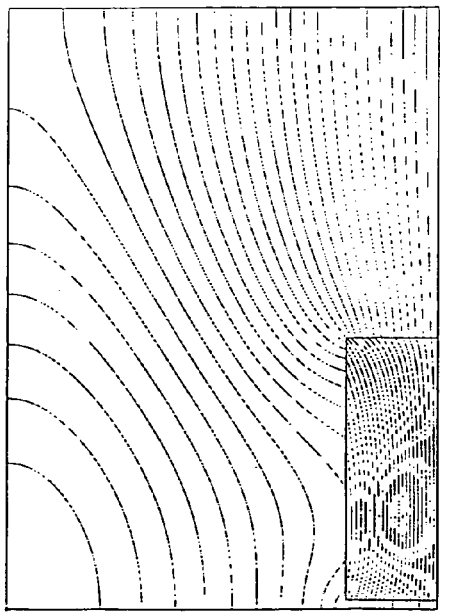
Figure 4:
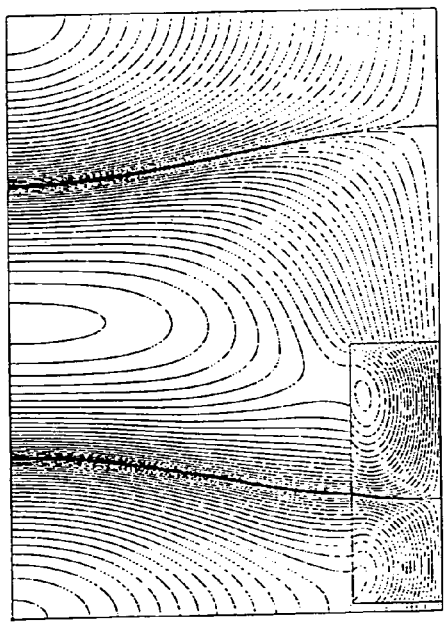

The operation of system 10 comprises measuring the frequency shift in the TM modes relative to the cavity resonance characteristics when empty, which shifts are caused by the introduction of a dielectric object into the cavity. FIG. 4 illustrates how the introduction of a wine bottle-size object with a diameter of 10 cm and height of 30 cm changes the structure of the resonant modes in cavity 12, relative to the resonant modes in the empty cavity, FIG. 3. The dielectric value of the test object was assumed to have epsilon $\in$ of 10 (relative to vacuum).

Figure 5:
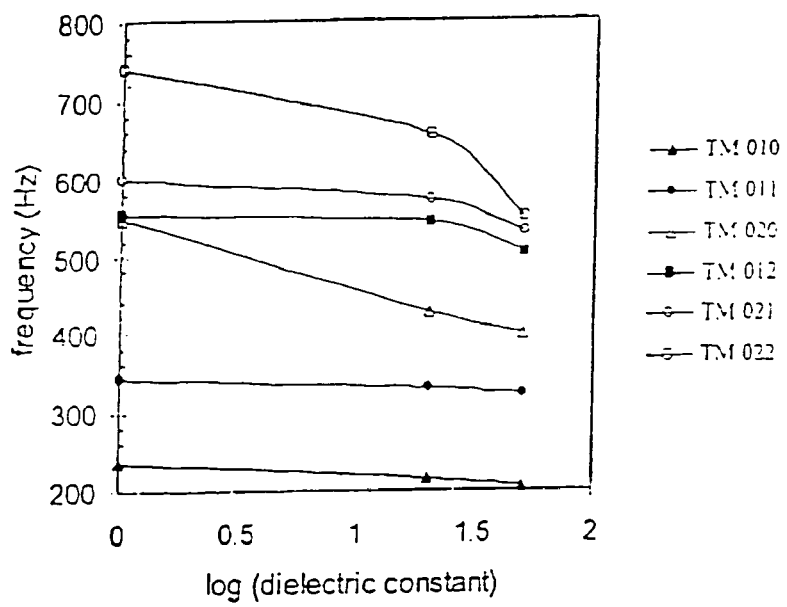
FIG. 5 illustrates how the resonant frequencies of the cavity change as a function of the dielectric value of the object placed in the cavity of FIG. 1.

FIG. 5 illustrates how the resonant frequencies of cavity 12 change as a function of the dielectric value for cavity 12. It can be seen from FIG. 5 that the device allows a linear response to the object for all values of the dielectric constant $\in < 25$. The nonlinearity at higher dielectric values is due to an electrical coupling between the internal modes of the dielectric and the cavity. This nonlinearity may be exploited to separate classes of liquids, such as oils and alcohol from water.

Figure 6:
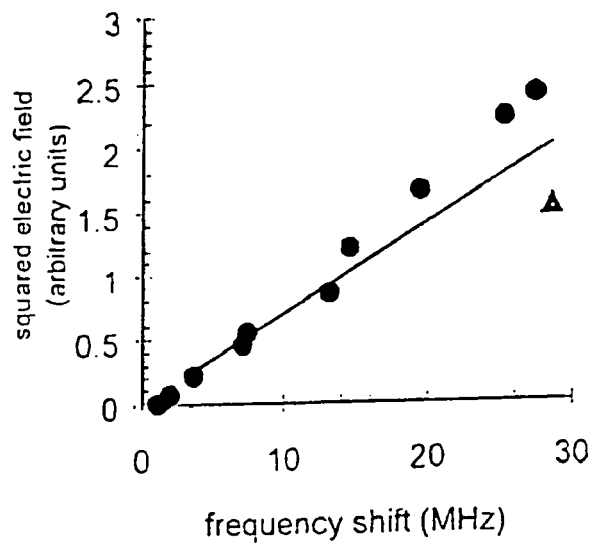
FIG. 6 illustrates how the change in frequency depends on the placement of the object in the cavity of FIG. 1.

One of the important discoveries relating to the present invention is that the amount of frequency shift varies with the size and shape of the object according to the "fit" with the modal electric field. In FIG. 6, the squared electric field in the vicinity of the object is plotted against the frequency shift for ten axial positions of a dielectric cylinder. FIG. 6 illustrates how the change in frequency depends on the placement of the object in the cavity, and in particular with the strong correlation with the local energy density. This is the reason that some modes are more strongly perturbed than others, depending on the spatial distribution of the object.

An apparatus or system 100 in accordance with a second preferred embodiment of the invention, as shown in perspective view in FIG. 7, will now be described. This apparatus also is useful for obtaining spatial information and for measuring dielectric constant.

Figure 8:
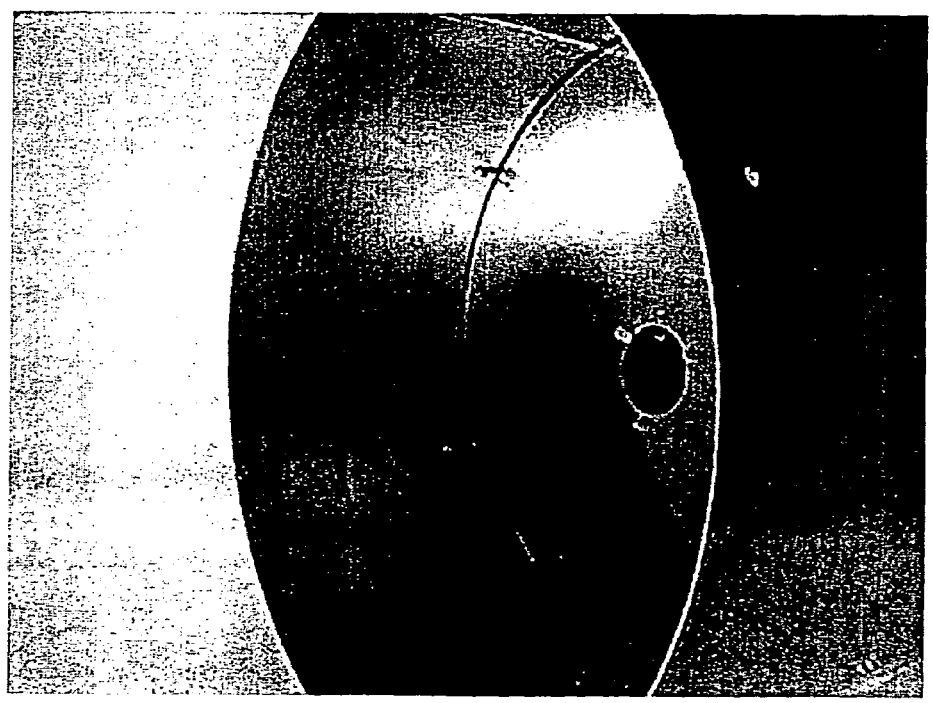
FIG. 8 is a photographic taken in perspective of the cavity for the detection system of FIG. 7.

System 110 includes a cylindrical cavity 112. Cavity 112 includes a bottom face or base 114, an axially movable top surface 116, and a cylinder wall 118. Cavity 112, including its components as just described, is made of a highly conductive material, such as aluminum or steel. Cavity 112 was fabricated from ¼-inch thick, 5052-H32 aluminum plate. The ¼-inch thickness used in this embodiment is sufficient for rigidity, yet ductile enough to roll into the curved cylinder wall 118. The cavity base 114 and cylinder wall 118 are permanently welded together. The electromagnetic cavity is the region between base 114, movable top surface 116, and conducting cylindrical wall 118. The conducting top of the cavity is the surface visible in FIG. 8 inside the cylinder. The side wall 118 of the cylinder extends to a height of 23.6 in (60 cm), but the empty volume above axially movable top shelf 116 is not used in this embodiment. The internal radius of cavity 112 is R=18.9 in (48 cm). The internal height of cavity 112 is h=6.5 in (16.5 cm).

Top face 116 is adjustable in its vertical position (along axis L and in a plane normal to axis L), thereby enabling tuning of the cavity. For example, by reducing the height of the cavity to h=6.5 in, the resonant frequencies of the TM0$np$ modes with mode numbers p>1 were excluded from the frequency range 150 MHz to 1.35 GHz. Resonant frequency generation and response analysis of cavity 112 at the reduced-height dimensions of h=8.0, 7.25, and 6.5 inches were performed. The height dimension h=6.5 in (16.5 cm) was determined to be the best from this analysis. At this dimension, the height to radius ratio is h/R=0.34.

The top face 116 of the cavity has a central aperture 116a for receiving the object to be tested. The diameter of aperture 116a is $d_a$=4.8 in (12.2 cm). Aperture 116a in top face 116 does not strongly affect the mode structure inside cavity 112. Nonetheless, it is normally desirable for the aperture to be as small as possible to avoid affecting the fields in the cavity, but while still be sufficient to physically contain and accommodate the desired range of objects to be analyzed. It should be noted that it is not necessary in all applications for the object to be completely contained within the electromagnetic cavity. It is only normally necessary for enough of the object to be within the cavity to obtain the desired measurement. As shown in FIG. 7, for example, only the base of the object 5 is within the electromagnetic cavity bounded at the top by top surface 116.

Figure 9:
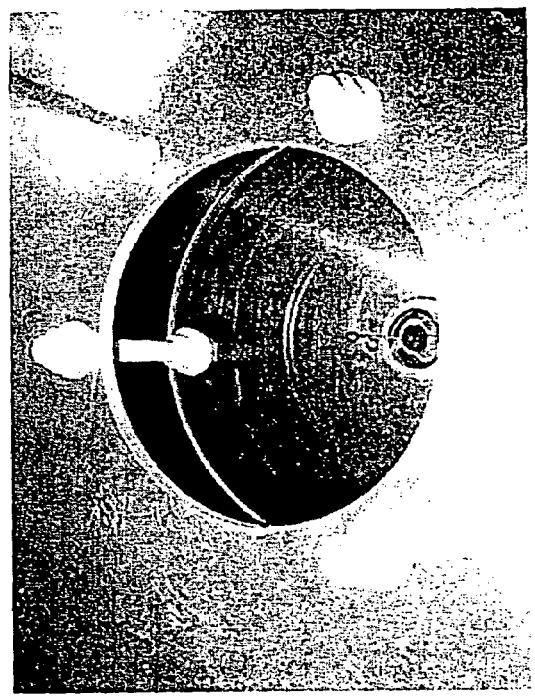
FIG. 9 is a photograph of the cavity interior for the cavity shown in FIGS. 7 and 8.

Cavity 112 further includes a substantially non-conductive support 119 within the cavity for supporting the object. The support shelf 119 is apparent in the photograph in FIG. 9. Support shelf 119 may comprise any one or combination of a variety of low-conductivity materials, e.g., fiberglass, fiberboard, phenolic, resins, and glass). Support 119 in this embodiment comprises a glass shelf suspended within the cavity beneath the aperture 116a by a set of threaded fiberglass rods. The depth of support 119 with respect to top face 116 of the cavity is adjustable, preferably by adjusting the axial height relative to top face 116 by means of nuts on the threaded fiberglass rods. It is preferably at a depth of about d=2.5 in (6.4 cm). The glass shelf is preferred because it appears to cause the least perturbation to the empty cavity frequency. Some perturbations in the internal fields within cavity 110 may be caused by the threaded fiberglass support rods. The desire to be able to tune the cavity/shelf system suggests that the rods preferably are adjustable. This suggests that glass rods as a replacement for the support rods would not be preferred.

System 110 also comprises an antenna system for directing electromagnetic radiation comprising a plurality of frequencies into the cavity, and for receiving a corresponding plurality of measured resonant TM modes. The antenna system of detector system 110 comprises a single radiating element, in this embodiment a whip antenna 121, fixed to the base 114 of cavity 112 below glass shelf 119, and positioned to be colinear with cylinder axis L. This positioning of antenna 121 allows it to interact with only a subset of resonant modes that have an electric field aligned with the central axis L of the cavity, and whose fields have angular symmetry about the axis. These properties are important for resonant mode selection. Antenna 121 is optimized for use in the frequency range of the desired application, which in this instance is about 150 MHz to about 1.35 GHz.

The use of a single antenna, as opposed to multiple antennas as in the first preferred embodiment of FIG. 1, can provide a significant modification in a number of respects. For example, the single antenna configuration uses the signal processor as a network analyzer as a method of measuring the signal loss in the cavity and antenna system. In the first embodiment 10, the signal processor was used as a spectrum analyzer to measure the electric field excitation in the cavity Single antenna designs also can simplify the electrodynamic characteristics of the cavity to better conform with the model results. In addition, a single antenna located in the center of the cavity bottom and axially aligned can provide azimuthal symmetry to the entire system.

The antenna design objectives for cavity 112 included: a compact size to fit inside the cavity, azimuthally symmetric radiation pattern, reasonable broadband characteristics in the operational frequency range, and low power operation.

Several types of antennas were investigated for use in apparatus and methods according to the invention. These included microstrip antennas (specifically, three commercial microstrip antennas optimized to the frequency ranges of 210–225, 410–490, and 800–900 MHz); linear quarter-wavelength whip antennas (specifically, three commercial whip antennas optimized for the frequency ranges 152–162, 450–470, and 800–900 MHz); coaxial stubs; the disk-terminated electric stub; and a circular polarized cavity-backed antenna.

The performance of the antennas were evaluated according to their ability to detect the resonant response in the cavity over the multiplicity of TM modes in the cavity 112, and to transmit power into the cavity over the broad operational range of the system 110. The 806–896 MHz quarter-wave whip antenna (Part No. QW800, Antenex, Inc., Glendale Heights, Ill.) was judged to be the most effective antenna for use in system 110, and it is preferred in this embodiment.

System 110 further comprises a signal processor operatively coupled to the antenna system for processing the measured resonant TM modes to obtain spatial information and/or the dielectric constant of the object being analyzed. The signal processor preferably comprises a spectrum analyzer and a data processor operatively coupled to the spectrum analyzer.

As implemented in system 110, a signal processor 126 comprising a Rhode & Schwarz FSP3 spectrum analyzer 126a with an internal tracking generator identical to spectrum analyzer 26a is provided. It is operatively coupled to antenna 121 via a standing wave ratio (SWR) bridge 130. The SWR bridge 130 is used to measure the return loss response of the antenna within the cavity via the spectrum analyzer 125. A sharp, narrow-band drop in the return signal indicates a resonance. The signal source incorporated into signal processor 126 provides a variable frequency radio signal to antenna 121 and thus cavity 112, and the spectrum analyzer 126a receives electromagnetic signals from antenna 121, and again from cavity 112, according to the excitation of electromagnetic fields inside the cavity. The generator and analyzer operate at zero offset between the transmitted and received frequencies. This allows for a frequency-by-frequency measurement of the cavity response. The frequency range over which system 110 is designed to operate is about 150 MHz to 1.35 GHz, thus providing a bandwidth of 1.2 GHz. The power transmitted to the antenna by the tracking generator is about 1 mW.

One consideration in the operation of the signal processor 126 and spectrum analyzer 126a is the sweep-time, or scan rate, across the frequency range. The sweep-time setting must be such as to allow the cavity to dynamically respond at each individual frequency interval. The operational sweep-time per frequency range chosen for system 110 was 100 milliseconds ("ms"). At 500 individual frequencies generated and analyzed per frequency range, the "on"-time at each frequency is 0.2 ms. By comparison, the relaxation time of a cavity with quality factor Q~2000, at the TM010 resonance frequency $\omega_0=2\pi \times 235 \times 10^6$ s$^{-1}$ is t=$2Q/\omega_0$~0.003 ms. Since the "on"-time greatly exceeds the relaxation time, the sweep rate is adequate for the cavity to respond well in the development of resonances.

The configuration illustrated by system 110 has demonstrated that partial immersion in the field by large objects and complete immersion by small objects is advantageous for measurement. For this purpose, cavity 112 has a central hole in the cavity top face 116, and the shelf 119 placed beneath it for supporting the test object. A benefit to this embodiment is that it is unnecessary to remove the cavity top in order to place test objects in the cavity and thus the field. Simulation results have shown that field leakage from the cavity out the central hole in the top face is small in magnitude, and the change in modal field structure is minor. However, the perturbation of the field in the vicinity of the hole edges may have a favorable effect for obtaining spatial information about test objects. The adjustable nature of cavity 112 and internal shelf 119 make it attractive for tuning and optimization, despite electromagnetic leakage around the top and through the central hole. Also affecting the cavity is the glass shelf and its fiberglass rods used for suspension. Though these components were designed to have a minimal effect, they do introduce small, non-azimuthally symmetric, perturbations, as noted above.

In accordance with another aspect of the invention, a method is provided for obtaining spatial information about an object. The method comprises interacting electromagnetic radiation at a plurality of frequencies with the object to obtain a corresponding plurality of measured resonant TM modes, and using the plurality of measured resonant TM modes to obtain the spatial information for the object. This method preferably comprises using the plurality of measured resonant TM modes to obtain spatial information about positions of the measured TM modes, and using the spatial information about the positions of the measured TM modes to obtain the spatial information about the object.

In a separate but related aspect of the invention, a method is provided for measuring the dielectric constant of an object. The method comprises interacting electromagnetic radiation at a plurality of frequencies with the object to obtain a corresponding plurality of measured resonant TM modes, and using the plurality of measured resonant TM modes to obtain the dielectric constant. The method according to a related aspect comprises using the plurality of measured resonant TM modes, which include dielectric constant information and spatial information relating to the object, to obtain the spatial information, and using the plurality of measured resonant TM modes and the spatial information to obtain the dielectric constant information and the dielectric constant for the object. Dielectric constant information is used broadly herein to refer to any information that can be used to obtain the dielectric constant, or that provides information as to the dielectric constant.

In presently preferred implementations of the method, the use of the plurality of measured resonant TM modes to obtain the spatial information for the object comprises using the plurality of measured resonant TM modes to obtain spatial information about positions of the measured TM modes, and using the spatial information about the positions of the measured TM modes to obtain the spatial information about the object. This may be implemented in a number of ways. Among them is included a method utilizing a Fourier-Bessel transform technique, as will be described in detail herein below. Another approach, also as will be described herein below, involves a method that uses statistical techniques based on parameters relating to the object.

Figure 7:
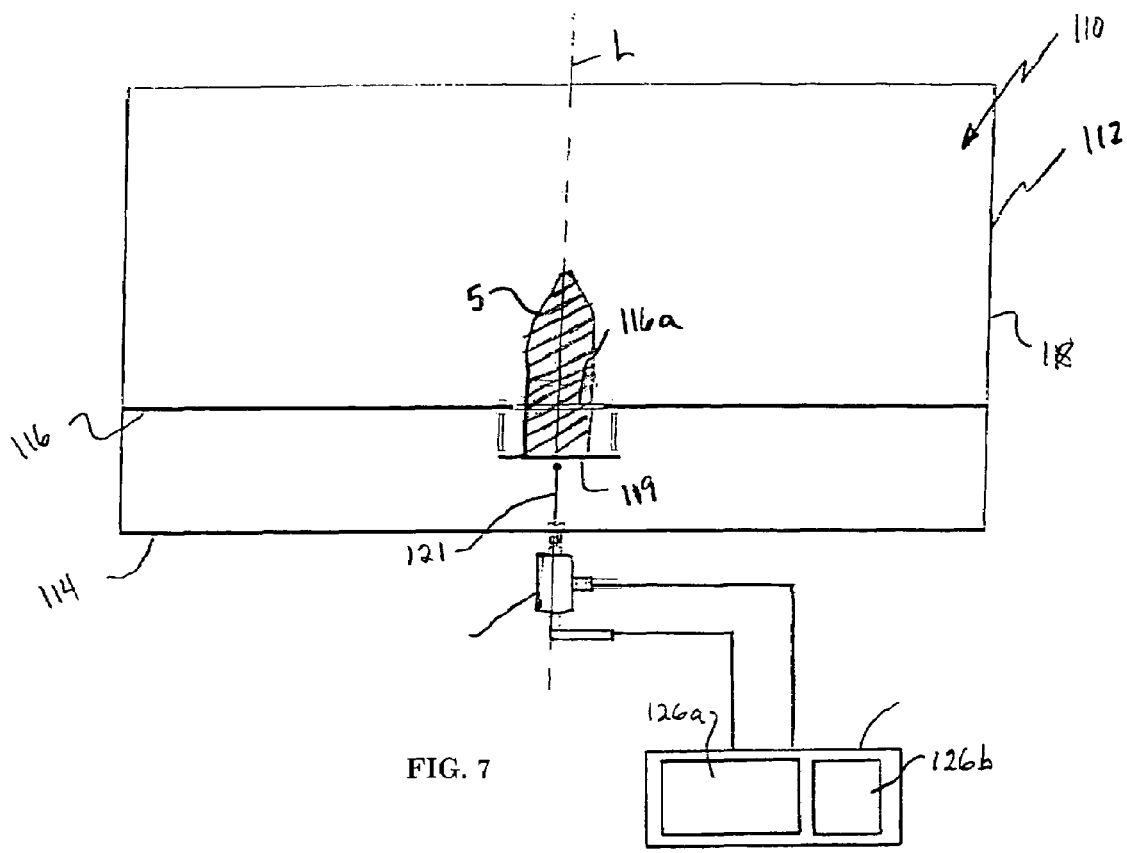
FIG. 7 is a schematic diagram of a detection system 100 in accordance with a second preferred embodiment of the invention.

Presently preferred implementations of these methods may be carried out using the systems shown in FIGS. 1 and 7 and described above. It will be appreciated and understood, however, that the methods are not necessarily limited to these specific hardware implementations.

Figure 10:
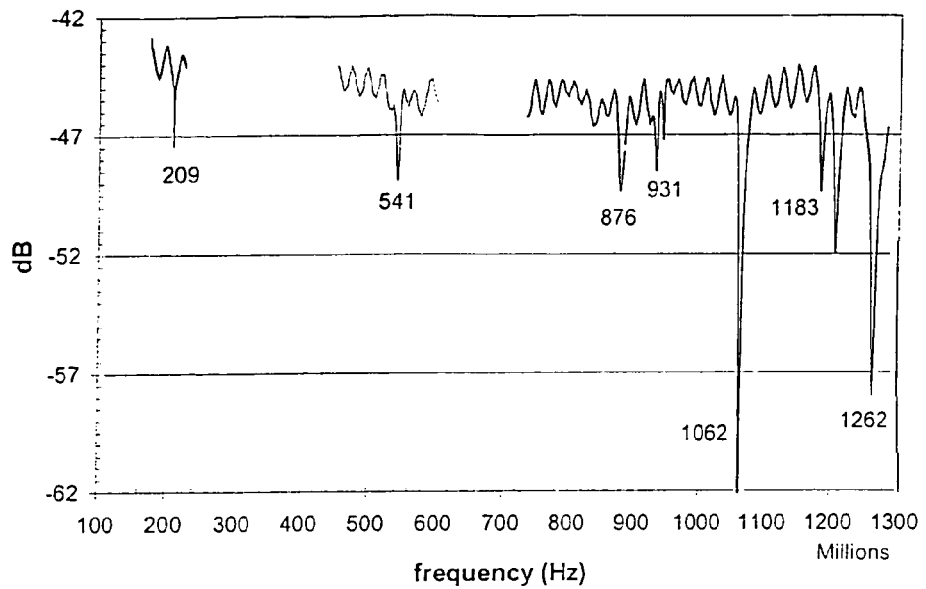
FIG. 10 is a graph of the resonant spectrum for the cavity of FIGS. 7 and 8.

As generally indicated above, the preferred method includes placing an object to be analyzed (the entire object or a sufficient portion of it to obtain the desired measurement) in the cavity, and using the signal generator to inject an electromagnetic radiation at a plurality of frequencies into the cavity to irradiate the object and cause the electromagnetic radiation to interact with the cavity and object to obtain a corresponding plurality of measured resonant TM modes. This signal is picked up by the antenna or receiving antenna and communicated to the spectrum analyzer and data processor. The spectrum analyzer extracts the frequency-amplitude information from the received signal and outputs it to the data processor. The data processor compares the TM0$np$ components from the received signal with corresponding components when the cavity is empty (base frequencies) to obtain frequency shift information. The spectrum of resonant cavity 112 when empty, for example, is shown in FIG. 10, with resonances labeled by their frequency. The data processor, e.g., using its arithmetic logic unit, uses the frequency shift data to obtain spatial information and dielectric constant data. It then uses the spatial information to normalize dielectric constant information, and compares the dielectric constant information with frequency shift data and correlated dielectric constant data for various known materials, for example, prestored in the data processor mass storage, to find a match and thereby identify the known material most closely matching the measured frequency shift data. Comparison with the frequencies predicted in Table 2, for example, shows good agreement with the theoretical calculation of resonant frequencies, and allows identification of the observed resonances with cavity modes.

The resonant frequencies of the cavity can be predicted from a solution of the wave equation based on Maxwell's equations. The class of wave solutions that have the electric field on axis is called TM (TM). These solutions can be represented in cylindrical coordinates, with axial coordinate z, and radial coordinate r. The interior of the cavity is the volume bounded by $0<r<R$ and $0<z<h$, where R is the radius and h the height. Individual TM cavity modes are identified with indices (m,n,p) where m=0 indicates no variation of fields in the azimuthal coordinate, n denotes the number of nodes in the radial direction, and p denotes the number of nodes in the axial direction. Because the preferred systems and methods detect modes with azimuthal symmetry, all of the modes of interest here will be $TM_{0np}$. These modes are designated herein as "TM-zero." The resonance frequencies are given by $$f_{0np}^{(TM)} = \frac{1}{2\pi}\frac{c}{\sqrt{\mu\varepsilon}}\sqrt{\frac{x_n^2}{R^2} + \frac{p^2\pi^2}{d^2}} \qquad \text{Eq. 1}$$

where $x_n$ is the nth root of the order zero Bessel function, $J_0(x_n)=0$. The first five roots are 2.405, 5.520, 8.654, 11.792, and 14.931. The resonant frequencies for the TM-zero cavity modes with frequencies less than 1.3 GHz are given in Table 2.

TABLE 2

Computed Resonant Frequencies of TM-Zero Modes

|  | m | n | p | Frequency (MHz) |
|---|---|---|---|---|
| TM | 0 | 1 | 0 | 235.4 |
| TM | 0 | 2 | 0 | 540.4 |
| TM | 0 | 3 | 0 | 847.2 |
| TM | 0 | 1 | 1 | 924.7 |
| TM | 0 | 2 | 1 | 1044.8 |
| TM | 0 | 4 | 0 | 1154.3 |
| TM | 0 | 3 | 1 | 1231.8 |

In addition to the seven TM-zero modes listed in Table 2, there are thirty-seven additional TM and transverse electric ("TE") modes with frequencies less than 1.3 GHz. In the presently preferred embodiments and methods according to the invention, only the TM-zero modes are used. If a complete spectrum were generated, the number of modes per frequency range becomes so large that identification would be difficult. It will be appreciated, however, that the preferred embodiments and methods do not necessarily require the exclusion or non-use of other modes.

Although not wishing to be bound by any particular theory, the preferred implementations of the methods according to the invention utilize the recognition that the spatial disposition of the TM modes in many instances are related to the spatial positioning of the object itself, and thus the TM modes provide spatial information that can be used to provide a measure or estimate of the spatial characteristics, e.g., size and shape, of the object. The introduction of a dielectric object into the electric field of an electromagnetic radiation at a selected set or range of frequencies causes the response of each mode to vary as a function of the object or container size and shape. The dielectric object causes a shift in the resonant frequencies of the modes as a function of the frequency of the incident radiation. This frequency shift is a function of the local electric field in the region occupied by the dielectric. This is illustrated in FIG. 6. The local electric field has a different structure for each resonance. From this information, one may infer spatial information about the object, such as its size and shape. This follows by correlating the TM mode information, e.g., the frequency shift information for the measured resonant TM modes, with the physical spatial information about the object. This information, while being independently useful in a number of applications, also can be used to normalize measured dielectric constant data to accommodate the size of the object. This aids in reducing or eliminating the ambiguities associated with size and shape of the object in dielectric detection devices and methods, and can provide a greatly improved, more accurate and reliable measure or estimate of the dielectric constant.

Figure 11:
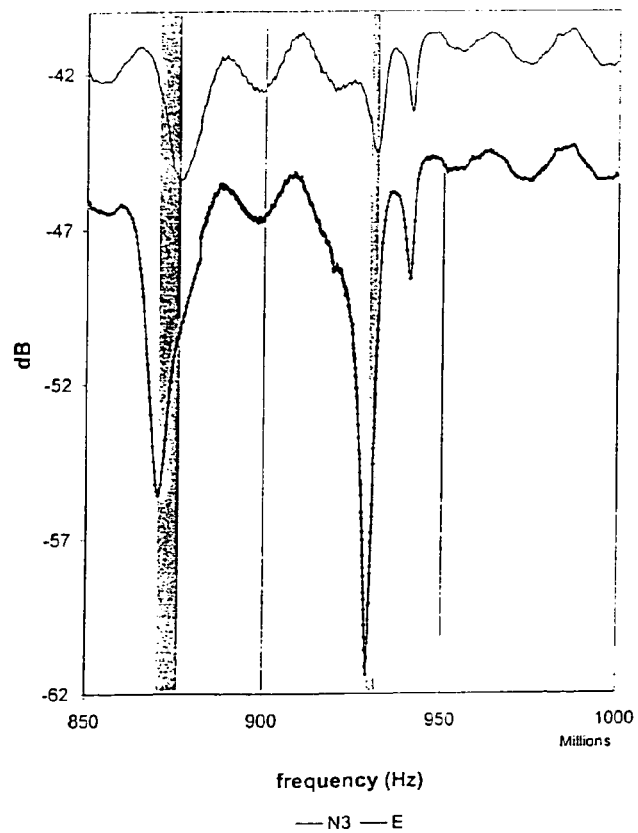
FIG. 11 is a graph showing the spectra of the cavity shown in FIGS. 7 and 8, empty and with a container or object in it.

Dielectric detection in the presently preferred embodiments and methods, as noted above, is based on the shift in frequency of the resonant modes when the dielectric object is placed inside the cavity. In a broad sense, the frequency shift is the result of capacitive loading of the cavity. An analogy is a capacitive circuit having a resonance frequency $\omega = 1/\sqrt{LC}$. Consider a simple capacitor consisting of a gap between two plates. The capacitance in this case will be proportional to the value of the dielectric constant, $\in$, in the volume between the plates, and is given in terms of the area, A, of the plate, and the gap d between the plates, by $C = \in A/d$. Thus, filling the capacitor with a dielectric will increase the capacitance, and lower the resonance frequency of the circuit. Similarly, introducing a dielectric object into the cavity will lower each of the resonance frequencies. This shift in frequency in the cavity 112 is illustrated in FIG. 11.

Figure 12:
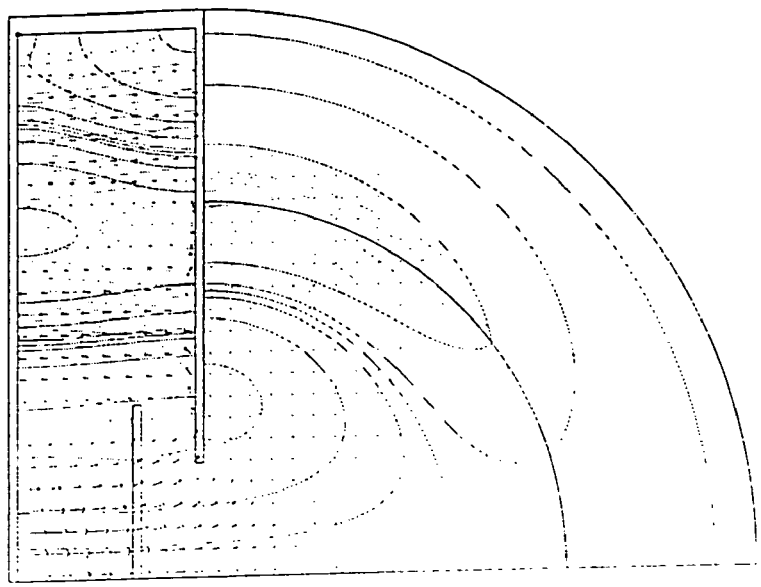
FIG. 12 is a graphical representation of the TM030 mode solution for the cavity of FIGS. 7 and 8, when the cavity is empty.
Figure 13:
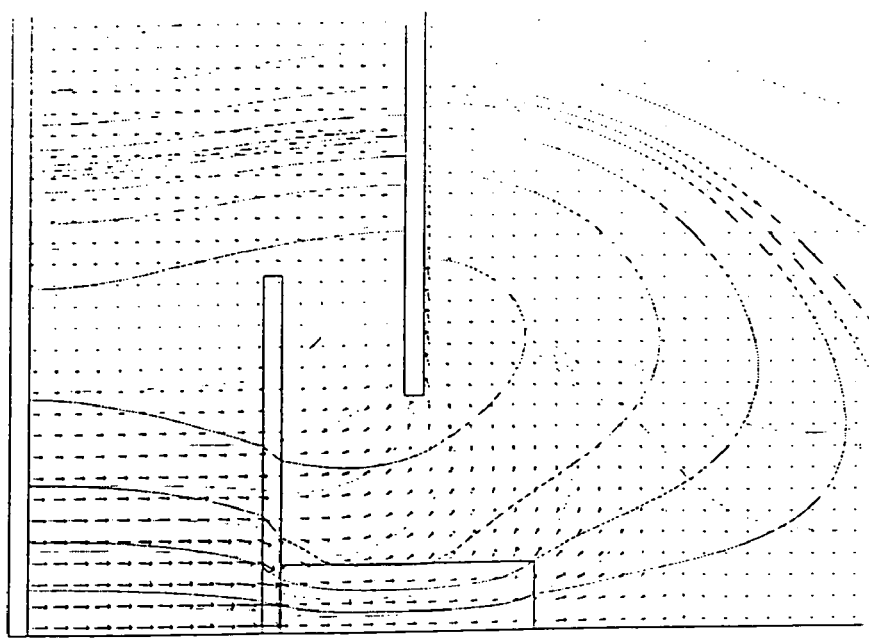
FIG. 13 is a graphical representation of the TM030 mode solution for the cavity of FIGS. 7 and 8 when the cavity includes a dielectric object.

The numerical solution for our empty cavity 112 in the particular example of the TM030 mode is shown in FIG. 12. The solution including the cylindrical object of dielectric value $\in = 5$ is shown in FIG. 13, illustrating the redistribution of fields due to polarization charge induced in the dielectric. In FIGS. 12 and 13, the arrows represent electric field vectors, and the contours are lines of constant r×H that help to guide the eye to lines of electric field. The frequency found in the numerical solution in FIG. 13 for the TM030 mode is 17.0 MHz lower than the numerical solution in the empty cavity.

As shown in Table 2, the computed resonant frequency range for the TM010 to TM031 modes is from 235 to 1,232 MHz, respectively. To ensure complete sampling of the spectra, systems 10 and 110 were designed to operate over the frequency range from 150 to 1,350 MHz.

The spectral resolution is important to ensure that the smallest frequency shifts imparted by the introduction of low-epsilon materials can be measured. For materials having a dielectric constant $\in$ of about 2, such as the solid acrylic calibration cylinders and petroleum oil, the frequency shift for the TM010 mode requires a resolution of at least 500 kHz for detection. Spectrum analyzer 26a and 126a is capable of resolution as small as 1 Hz. In systems 10 and 110, resolutions of 100 kHz and 300 kHz were used. Tests determined that these were minimum resolutions needed to definitively measure the frequency shifts without oversampling and creating too much data in these systems.

The data output characteristic of spectrum analyzer 26a and 126a is such that for any given frequency range, the spectrum analyzer outputs 500 data points. Therefore, at a resolution of 100 kHz, the frequency range can span 50 MHz. Thus for a total bandwidth of 1.2 GHz covering the range from 150 MHz to 1.35 GHz, 24 data sets are generated totaling 12,000 data points. Comparatively, at a resolution of 300 kHz, the frequency range can span 150 MHz. Thus for a total bandwidth of 1.2 GHz covering the range from 150 MHz to 1.35 GHz, 8 data sets are generated totaling 4,000 data points. Analysis showed that 300 kHz resolution was adequate in measuring the TM010 mode frequency shifts for low-dielectric constant materials with systems 10 and 110. In fact, at 300 kHz resolution, systems 10 and 110 can measure the TM010 mode frequency shifts when empty hollow test cylinders are placed in the cavity.

One method according to this aspect of the invention for obtaining spatial information from the TM mode information involves a Fourier-Bessel method, which will now be described.

In this method, a series expansion technique is used in order to relate the multiple frequency data to the spatial distribution of the dielectric. The method takes advantage of the recognition that the magnitude of the frequency change for the resonant TM modes is related to the Fourier Bessel representation of the physical spatial distribution of the object. The frequency change can be equated to the spatial transform because the axial electric field of the set of resonant TM modes has the same functional form as the Fourier-Bessel basis set of functions, and in addition the frequency perturbation produced by the object depends on the electric field in the vicinity of the object.

An arbitrary function on an interval $0 < \rho < R$ can be expanded as a Fourier-Bessel series in the radial coordinate, $$f(\rho) = \sum_{n=1}^{\infty} A_n J_0(x_n \rho / R),$$

where $J_0$ is the Bessel function, $\rho$ is the radial coordinate, R is the radius of the cavity, and $x_n$ is the $n^{th}$ root of $J_0(x)=0$. In addition, an arbitrary function on an interval $0 < z < L$, where L is the height of the cavity, can be expanded as a cosine series in the axial coordinate, $$g(z) = \sum_{p=1}^{\infty} A_p \cos(p \pi z / L).$$

Thus, if the function for the dielectric constant is separable ∈(ρ, z)=f(ρ)g(z), the dielectric constant function can be written as a series sum:

$$\varepsilon(\rho, z) - \varepsilon_0 = (\varepsilon - \varepsilon_0) \sum_n \sum_p A_{np} \Psi_{np},  \quad \text{Eq. 2}$$

where the basis functions are given by $$\Psi_{np} = J_0\left(\frac{x_n \rho}{R}\right) \cos\left(\frac{p\pi z}{L}\right). \quad \text{Eq. 3}$$

The coefficients of the Fourier-Bessel series can be derived mathematically (see, for example, Equations 6 and 7). In this implementation, the Fourier-Bessel coefficient is equated to the frequency shift, $A_{np} = \Delta f_{0np}$, such that the modal coefficients can be measured in an analog fashion as the change in resonant frequency, $\Delta f_{0np}$, produced by the introduction of the dielectric into the cavity. This assumption is supported, for example, by the recognition that the largest effects of the dielectric occur where the electrical energy is most concentrated, a weighting, which is similar to the mathematical integration solving for $A_{np}$.

Recognizing that the axial electric field has the exact same functional form as Equation 3, i.e., for the $TM_{0np}$ mode, the electric field component is $E_z = \text{constant} \times \Psi_{np}$.

Figure 14:
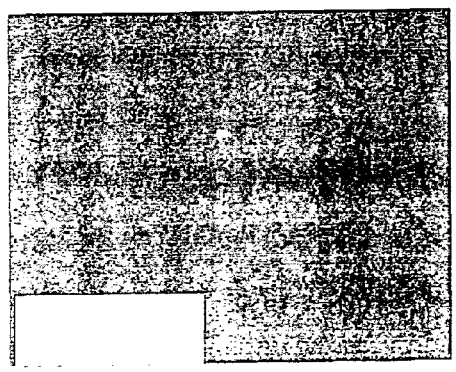
FIG. 14 illustrates a low resolution image of an object obtained by summing five modes with amplitudes derived from the frequency shift associated with placing the object in the cavity of FIG. 1.
Figure 14:
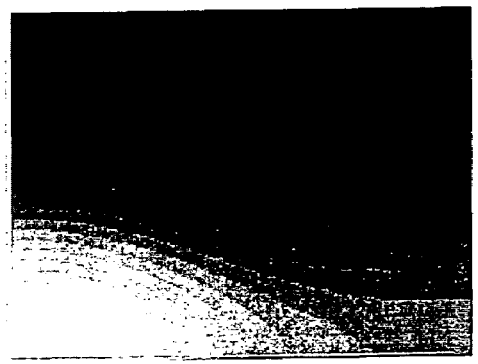

FIG. 6 illustrates that the change in frequency measures the correlation of the spatial distribution of the modal field and the spatial distribution of the dielectric object. Because the functional elements of the Fourier-Bessel sum (see Equation 2) for the spatial dielectric material are the same as the functions describing the modal field, this method enables one to obtain a mathematical transform of the dielectric material's (the object's) shape using the cavity as an analog device. This method is implemented in broader methods according to the invention as described herein by adopting the frequency shift as a measure of the spatial transform components, $A_{np}$, of the dielectric function, and performing an inverse transform to obtain an image of the dielectric (object). In the preferred implementation of this method, a sum of five modes is added together with the amplitudes derived from the frequency shift to obtain a low resolution image of the dielectric object, for example, as illustrated in FIG. 14.

Figure 15:
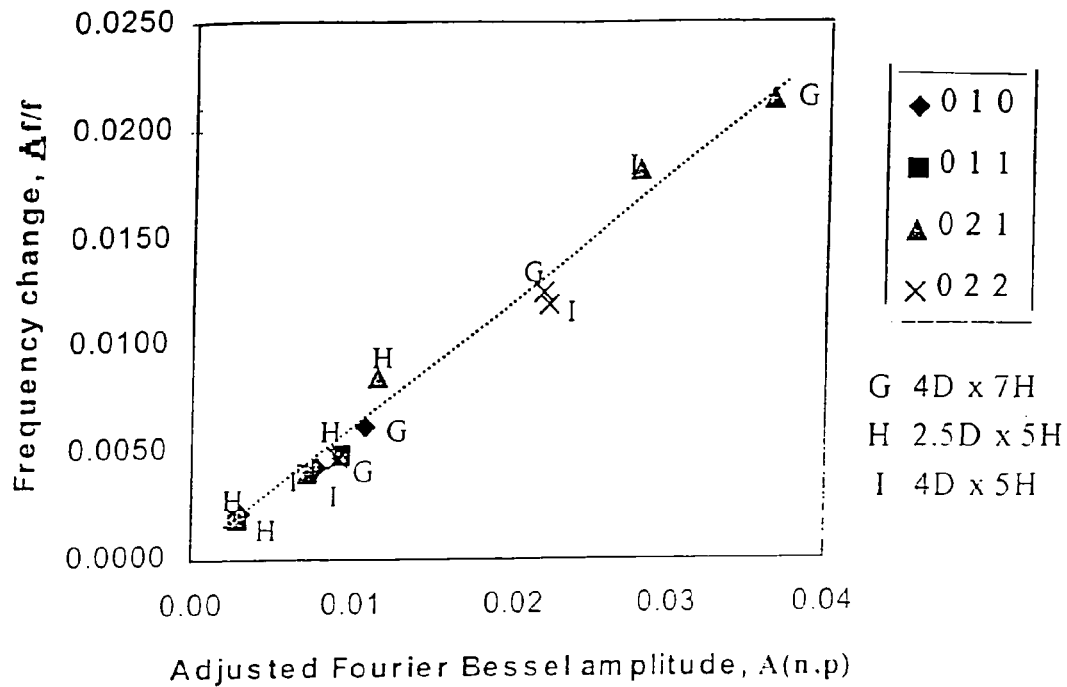
FIG. 15 shows the frequency shift versus computed Fourier-Bessel spatial transform coefficients.

FIG. 15 shows a plot of the frequency shift or change Δf/f as a function of the computed or adjusted Fourier-Bessel amplitude, A(n,p) for known sample or test objects. The adjustment to Fourier-Bessel amplitudes represents a normalization to energy content of the respective modes. The frequency shifts are plotted for the first four TM modes, and three different size plastic cylinders. This demonstrates the correlation used for Fourier-Bessel reconstruction.

The Fourier-Bessel method offers particular advantage when it comes to solving the inverse problem. This requires an assumption that the change in electric field in the object is proportional to the central value of the field, $E_{z0} = E_z(r=0)$:

$$E_z \rightarrow E_z + \left(\frac{\varepsilon_0}{\varepsilon} - 1\right) E_{z0}. \quad \text{Eq. 4}$$

In this case, the change in resonant frequency can be written as $$\left(\frac{\Delta \omega}{\omega}\right) = \frac{\varepsilon - \varepsilon_0}{\varepsilon} \times A_{np}. \quad \text{Eq. 5}$$

where $A_{np}$ is a number for each mode (n, p) which depends only on the diameter and height of the container. In this method, the numbers relate to a Fourier-Bessel transform of the volume taken up by the dielectric. We illustrate by the example of the Fourier-Bessel coefficients of a cylindrical container of 2.5 inches outer diameter and 2.5 inches in height in the space contained by the cavity 112. The coefficients of the Fourier-Bessel series are given by $A_{np} = B[n]C[p]$, where $$B[n] = \frac{2}{R^2 J_1^2(x_{0n})} \int_o^r \rho J_0\left(\frac{x_{0n}\rho}{R}\right) d\rho; \quad \text{Eq. 6}$$

$$C[p] = \frac{2}{L} \int_0^h \cos\left(\frac{p\pi z}{L}\right) dz. \quad \text{Eq. 7}$$

Particular values for n=3 and p=0 are given in Table 3, together with the predicted change in resonant frequency computed from Equation 5 for the case of salt filling the container.

TABLE 3

Frequency Shift in TM030 Predicted by Calculation of the Fourier-Bessel Transform Coefficient

| 2.5"OD container B[3] | 2.5"H length inside cavity C[0] | dielectric of salt | frequency shift |
|---|---|---|---|
| 0.057 | 0.38 | 5 | 14.8 MHz |

Computed in this way, the frequency shifts constitute an analog to the Fourier-Bessel transform of the dielectric volume. Thus, the solution to the inverse problem uses the set of frequency shifts as Fourier-Bessel coefficients, and computes the inverse transform. This method can be used to obtain spatial information about the object. The magnitude of the TM mode frequency shifts thus can be related to the dielectric constant of the object, the amount of material, and its size and shape.

It should be noted, however, that the performance of the Fourier-Bessel reconstruction method appears to degrade for dielectric values that are substantially different from unity. This is probably because a small perturbation of the field is important for and underlies the assumption in Equation 4. The computed and observed frequency shifts may also differ because of the extension of the fields and the object through the opening in the top 116 of the cavity.

As an alternative to, or in addition to, the Fourier-Bessel method described-herein above, another method for obtaining or correlating spatial information about the object from the TM mode information. A consistent analytical formulation for predicting frequency shifts would be desirable to invert the measurements for the electrical parameters of the object. Known theoretical and computational models do not provide a solution that is sufficiently robust to predict the frequency shifts of the full range of objects that may be sought to be tested. This limitation may be overcome by a method according to this aspect of the invention, in which frequency shifts are predicted by analyzing the change in the frequency shift with variation of parameters. For example, each resonance shift is affected by a change in the volume of the container. One can similarly quantify the change in frequency shift with dielectric constant of the material, surface area of the container, and the complexity of the fields in the container (measured, for example, by the internal resonance frequency). These differential measures can constitute a "model" applicable to each resonance frequency. Using the model, a statistical method is used to vary all the parameters to obtain the best solution to the dielectric constant and container or object geometry applicable to the full set of measured frequency shifts. The statistical parameter provides the value of a metric to evaluate the solution.

The parametric fit for each line can be specialized to a selection of specific containers or material types. The model can "learn" a new object by including its data set into the parametric line fitting. Thus, the method preserves the value of a "lookup table" of containers/materials, while the model allows evaluation of objects not in the lookup table.

In the presently preferred implementation of this method, the frequency shifts are allowed to depend on the following object properties:

| | |
|---|---|
| V | container volume, $(\pi D^2/4)$ H |
| A | container area, $\pi D^2/4 + 2\pi DH$ |
| $\epsilon - 1$ | dielectric constant |
| $\epsilon^2$ | nonlinearity in dielectric constant |
| $\sqrt{\epsilon} D$ | parameter proportional to the internal resonance frequency of the object |

To implement the model, a standard regression analysis may be used to minimize the quantity $X^2$. Using TM030 as an example, $$\chi^2 = \sum_i^{objects} \left(-\frac{\varepsilon_i + 2}{\varepsilon_i - 1}\Delta f_i + a_{030} + b_{030}V_i + c_{030}A_i + d_{030}\sqrt{\varepsilon_i}\, D_i + e_{030}\varepsilon_i\right)^2 \quad \text{Eq. 8}$$

as a function of the fitting parameters ($a_{030}$, $b_{030}$, $c_{030}$, $d_{030}$, $e_{030}$). The sum is over the objects in the parameter fit data set. The magnitude of the frequency change is assumed to scale as $$\Delta f \propto \frac{\varepsilon - 1}{\varepsilon + 2} \quad \text{Eq. 9}$$

following the Clausius-Mossotti equation (see Jackson, J. D., Classical Electrodynamics, 2d Ed. (Wiley, 1975), p. 155). The initial model was determined by laboratory test data using the set of containers and materials presented in Table 4. In each test, the object was placed on shelf 119 internal to the cavity, and the resonant frequency of each of the seven resonant cavity modes was measured. The model for each line is determined in the manner of Equation 8. The mean standard deviation for the TM030 fit among all the objects tested is $\sigma_{\Delta f}$=1.4 MHz.

TABLE 4

Test Set

| ID | dielectric material | outer diameter (in) | height (in) |
|---|---|---|---|
| S | plastic | 4.0 | 5.125 |
| LH | water | 3.75 | 5.0 |
| MH | water | 2.25 | 5.0 |
| MS | plastic | 2.5 | 5.125 |
| N1 | salt | 2.25 | 1.625 |
| N2 | salt | 2.25 | 3.4 |
| N3 | salt | 2.25 | 4.875 |
| N | salt | 3.25 | 5.25 |

Figure 16:
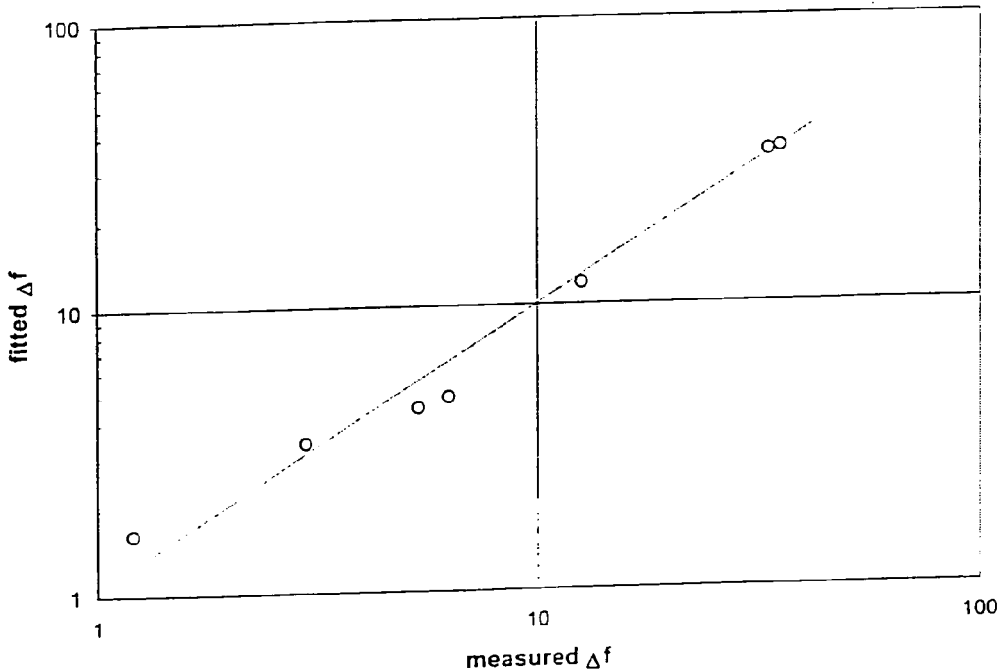
FIG. 16 is a graphical representation of the frequency shift predicted by the parameter fitting technique versus the measured frequency shift in the TM030 mode for particular objects tested using the detection system of FIG. 7.

The success of this preferred model in predicting frequency shift in the example of the TM030 mode is shown graphically in FIG. 16. The result specific to the shift of the salt container N3 as measured in cavity 112 is summarized in Table 5. The standard deviations in the parametric models of the other six resonances range from 0.05 MHz to 0.5 MHz.

TABLE 5

Frequency Shift in TM030 Predicted by the Parametric Resonance Model

| Parametric Model for TM$_{030}$ | | | | | frequency shift |
|---|---|---|---|---|---|
| $a_{030}$ | $b_{030}$ | $c_{030}$ | $d_{030}$ | $e_{030}$ | |
| 5.250 | 0.737 | −0.172 | −1.387 | 0.632 | 4.8 MHz |

In accordance with the preferred embodiments and methods, for each dielectric detection performed on an object or container inserted into system 10 or 110, the output data comprises the measurement of the frequency of each of seven resonant modes. The information provided by the measured spectrum of the cavity is used to calculate the dielectric constant and infer the spatial geometry of the object.

Applying the frequency shift data to the solution of the dielectric constant of the test object can be viewed as the "inverse" of the problem of predicting the modal frequency shifts of the object. The solution thus can assume the nature of a stochastic analysis.

In accordance with this preferred method, a range of dielectric constant values are evaluated against the parametric model by using the statistical "chi-square" parameter:

$$\chi^2(\varepsilon) = \sum_i^{modes} \frac{1}{\sigma_i^2}\left(-\frac{\varepsilon + 2}{\varepsilon - 1}\Delta f_i + a_i + b_i V + c_i A + d_i S + e_i \varepsilon\right)^2. \quad \text{Eq. 10}$$

Figure 17:
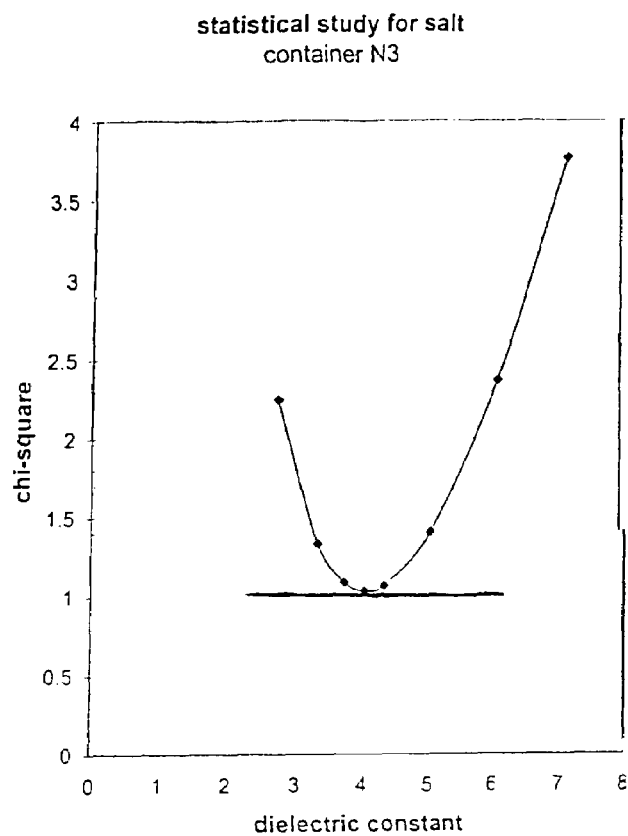
FIG. 17 shows a graphical representation of the chi-square variable versus the dielectric constant for a container of salt measured in the detection system of FIG. 7.

The value of chi-square for each choice of dielectric constant is obtained by linear regression analysis for V, A, and S (container volume, area, and diameter times root dielectric constant). The output can be presented graphically, for example, as shown in FIG. 17. The smallest chi-square parameter corresponds to the most probable value of the dielectric constant.

Using this preferred method, essentially all possible solutions can be tested and the one that provides the best fit to all of the resonant models can be identified. From FIG. 17, $\varepsilon$=4.1 is the best fit to dielectric constant. The container geometry can be computed redundantly from V and A. The computed height is H=6.7 in and H=6.4 in, respectively, and the computed diameter D=3.0 in. The actual measurements of container N3 are H=5 in and D=2.5 in, and the dielectric constant for salt has been assumed to be ∈=5.

Additional use can be made of the chi-square parameter to evaluate the consistency of the solution with the model. As a random variable, $\chi^2$ will have a chi-square distribution with four degrees of freedom (8 data measurements less four free parameters). Thus, $\chi^2$ will have a value less than 7.5 most of the time (at the ninety percent level), and typically $\chi^2<3$ half of the time. A value greater than 7.5 is probably an indication that the fit did not converge and the solution is a poor one. The computed values of H and D can also be gauged against the physical size of the object.

Another use of statistics in accordance with the method and its variations is to consider the function $\chi^2$ (∈) as a probability distribution for the dielectric constant, and to estimate the mean-square deviation of the derived value of ∈ in this way. From FIG. 17, a change in $\chi^2$ to $\chi^2+1$, which is indicative of the range of one standard deviation, occurs for ∈=2.9 and ∈=5.6. Thus, we can use these limits as an estimate error in our calculation for dielectric constant.

Figure 18:
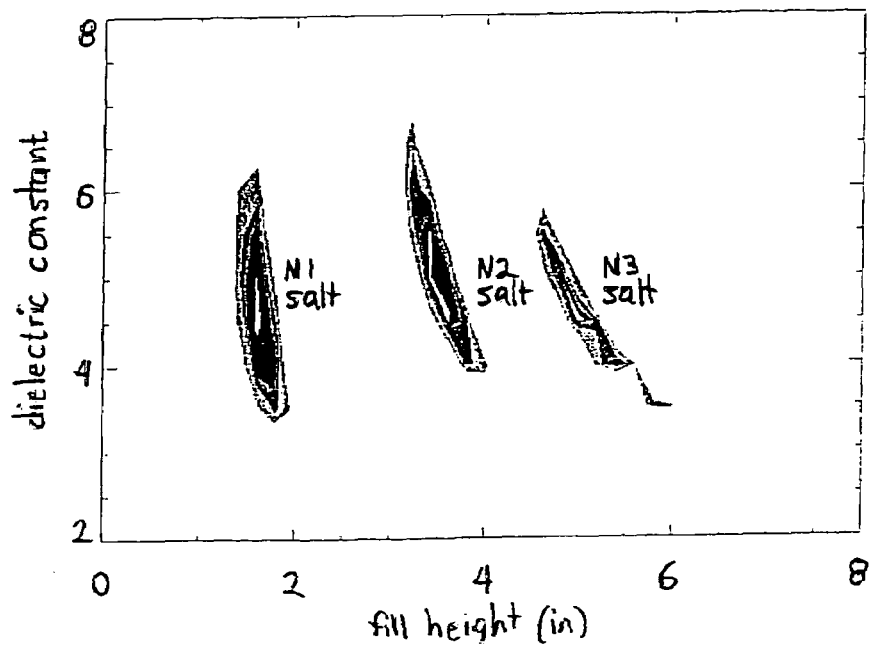
FIG. 18 shows a graphical representation of contours of constant chi-square in solution space for three containers of salt measured in the detection system of FIG. 7.

The ability of systems 10 and 110 to discriminate among different object or container sizes and dielectric materials is demonstrated in FIG. 18. It presents a graphical solution to the minimum chi-square by the plot of (filled) contours of constant chi-square ($\chi^2$=1, 1.5, 2, 3, and 4) in a space where the abscissa is container height, and the ordinate is dielectric constant. All cases correspond to the diameter of 2.5 in. The different test objects are shown on the same plot are three different containers of salt (N1, N2, and N3 from Table 4). The minimum interior contour represents the best solution derived from test data. The breadth of the contours is a good indication of measurement error. The inferred dielectric constant for the salt is ∈ and 5 for each of the three containers, independent of the amount of the salt. The solutions for the remaining test objects are equally unambiguous.

FIG. 18 shows that systems 10 and 110 have achieved the goal of identifying materials by their dielectric value, irrespective of the container size, using measurements of cavity mode resonant frequencies.

EXAMPLES

A number of examples in which objects have been tested using systems 10 and 110 will now be described.

To obtain base frequency information and initial information on the response of the cavities to the presence of a dielectric object, measurements were made with an empty cavity, and with a container filled with table salt (case N3). FIG. 11 compares the spectrum between empty cavity 112 and cavity 112 when the container filled with salt (case N3) was placed on the internal shelf. The spectral range plotted includes TM030 and TM011, and shows a frequency shift in each mode. The empty spectrum has been displaced upward by +4 dB to separate curves. The vertical lines help to show that the resonances occur at different frequencies for the two cases. The frequency shift data for TM030 is summarized in Table 6. The measured value in Table 6 may be compared with the value predicted by the Fourier-Bessel transform method (Table 3), and the predicted value from the parametric model (Table 5).

TABLE 6

Detected Frequency Shift in TM030

| TM030 Resonant Frequency Empty Cavity | TM030 Resonant Frequency Salt 2.5" OD × 5" H | Frequency Shift |
|---|---|---|
| 876.6 MHz | 870.3 MHz | 6.3 MHz |

The amount of frequency shift depends on the mode, and varies with dielectric value of the material, and the distribution of the material (i.e., the container shape).

The performance of systems 10 and 110 was tested for various examples of container sizes (Table 7) and dielectric materials (Table 8). Calibration cylinders made of solid acrylic served as a control set of dielectric objects. The plastic material was chosen because of its known dielectric constant value. The calibration cylinders represent a homogeneous object having no internal interface surfaces to reflect or refract the applied field, and the simple geometry facilitates comparison with computer simulation. The three basic sizes of test cylinders were chosen to approximate, in size, containers ranging from a perfume or prescription bottle, a soft drink can or water bottle, and a wine bottle. The dimensions and properties of the calibration cylinders are shown in Table 9.

TABLE 7

Test Containers

| Label ID | Diameter (cm) | Height (cm) | Construction Material |
|---|---|---|---|
| A | 10 | 18 | Acrylic |
| B | 6 | 13 | Acrylic |
| C | 4 | 6 | Acrylic |
| D | 10 | 18 | Glass |

The composition of sample test liquids was chosen to cover a range of dielectrics from unity to 80. The identities of sample test liquids are shown in Table 8.

TABLE 8

Test Liquids

| Label ID | Material | Dielectric Constant, ε |
|---|---|---|
| 1 | Empty | 1.0 |
| 2 | Petroleum Oil | 2.1 |
| 3 | Peanut Oil | 3.0 |
| 4 | Isopropyl Alcohol | 18.3 |
| 5 | Water | 80 |

TABLE 9

Solid Acrylic Calibration Cylinders

| Diameter (cm) | Height (cm) | Dielectric Constant, ε | Volume (mL) |
|---|---|---|---|
| 10 | 18 | 2.5 | 1414 |
| 10 | 13 | 2.5 | 1021 |
| 6 | 13 | 2.5 | 368 |
| 4 | 6 | 2.5 | 75 |

Finally, it should be noted that there is limited documentation on dielectric constants in the specific frequency range of these experiments. The values of dielectric constant ∈ supplied for most materials are measured using dielectric constant meters that operate in frequency ranges of tens of kilohertz, while systems 10 and 100 operate at about 150–1, 350 MHz. Epsilon for many materials is not constant, but is a function of frequency. For example, it is well known that in polar materials the partial orientation of permanent dipole moments decreases at higher frequency, and in water the dielectric constant decreases above 100 GHz. Furthermore, if the material is nonhomogenous, electrical double layers and the Maxwell-Wagner effect at interfacial boundaries affect the dielectric constant in a frequency dependent fashion. Thus, the identity of epsilon values as dielectric "constants" may not be correct, and values extrapolated into the radio frequency and microwave regime may not be accurate.

Another configuration of the cavity according to preferred embodiments of the invention that has been tested involves partly filling the cavity with a low-loss, high dielectric constant material. For this a water-saturated polyurethane foam was used. The purpose of this modification was to lower all of the resonant frequencies in order to preclude nonlinear interactions between internal modes in the container (object) and the cavity. Simulations have shown that the high-dielectric liner can shape the electric field, and moderate the perturbation caused by the dielectric object. A cavity height of h=7.5 in (19 cm) was chosen to accommodate a 4-inch thick liner of polyurethane foam and shelf depth of 3.5 inches. Although the method was successful in lowering the resonant frequencies, radiative absorption by the liner material made this example unsuited to the measurement of resonant frequency shifts.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A method for obtaining spatial information about an object, the method comprising:
    interacting electromagnetic radiation at a plurality of frequencies with the object to obtain a corresponding plurality of measured resonant transverse magnetic modes; and
    using the plurality of measured resonant transverse magnetic modes to obtain the spatial information for the object, wherein the use of the plurality of measured resonant transverse magnetic modes to obtain the spatial information for the object comprises using the plurality of measured resonant transverse magnetic modes to obtain spatial information about positions of the measured transverse magnetic modes, and using the spatial information about the positions of the measured transverse magnetic modes to obtain the spatial information about the object, the use of the plurality of measured resonant transverse magnetic modes to obtain spatial information about positions of the measured transverse magnetic modes comprising using a Fourier Bessel transform.

2. A method as recited in claim 1, wherein the use of the plurality of measured resonant transverse magnetic modes to obtain spatial information about positions of the measured transverse magnetic modes comprises using parameters relating to the object.

3. A method for measuring the dielectric constant of an object, the method comprising:
    interacting electromagnetic radiation at a plurality of frequencies with the object to obtain a corresponding plurality of measured resonant transverse magnetic modes, the measured resonant transverse magnetic modes comprising dielectric constant information and spatial information relating to the object, wherein the obtaining of the plurality of measured resonant transverse magnetic modes comprises obtaining $TM_{0np}$ modes, wherein n and p assume ascending integer values;
    using the plurality of measured resonant transverse magnetic modes to obtain the spatial information;
    using the using the plurality of measured resonant transverse magnetic modes and the spatial information to obtain the dielectric constant information and the dielectric constant for the object.

4. A method as recited in claim 3, wherein the plurality of measured resonant transverse magnetic modes comprise at least the first four of the ascending $TM_{0np}$ modes.

5. A method as recited in claim 3, wherein the obtaining of the plurality of measured resonant transverse magnetic modes comprises measuring a frequency shift corresponding to a difference between a base frequency and each of the measured resonant transverse magnetic modes.

6. A method as recited in claim 3, wherein the using of the plurality of measured resonant transverse magnetic modes to obtain the spatial information comprises obtaining a position for each of the measured resonant transverse magnetic modes, and correlating the position of the measured resonant transverse magnetic mode with the spatial position of the object.

7. A method as recited in claim 6, wherein the correlating comprises superposing the position for the measured resonant transverse magnetic mode in a Fourier-Bessel construction to obtain the spatial position of the object.

8. An apparatus for measuring the dielectric constant of an object, the apparatus comprising:
    a cavity having a size and a shape sufficient to physically accommodate the object, the cavity being substantially cylindrical in shape;
    an antenna system for directing electromagnetic radiation comprising a plurality of frequencies into the cavity, and for receiving a corresponding plurality of measured resonant transverse magnetic modes; and
    a signal processor operatively coupled to the antenna system for processing the measured resonant transverse magnetic modes to obtain the dielectric constant for the object;
    wherein each of the plurality of resonant transverse magnetic modes has a resonant frequency,
    the cavity has a height h and a radius R, and
    the ratio of the height h to the radius R is selected to cause the resonant frequencies to be distinct from one another.

9. An apparatus as recited in claim 8, wherein:
    the cavity has a height h and a radius R; and
    the ratio of the height h to the radius R is about 0.3 to about 2.7.

10. An apparatus as recited in claim 8, wherein:
    the cavity has a height h and a radius R; and
    a ratio of the height h to the radius R is about 1.25.

11. An apparatus as recited in claim 8, wherein:
    the cavity has a height h and a radius R; and
    a ratio of the height h to the radius R is about 0.34.

12. An apparatus as recited in claim 8, wherein the cavity comprises a substantially non-conductive support within the cavity for supporting the object.

13. An apparatus as recited in claim 12, wherein the shelf comprises a glass material.

14. An apparatus as recited in claim 8, wherein:

the cavity comprises a substantially cylindrical shape and comprises a cavity axis that is coincident with a cylinder axis; and the antenna system is configured to receive the corresponding plurality of measured resonant transverse magnetic modes at the cavity axis.

15. An apparatus as recited in claim 8, wherein the antenna system comprises an antenna for directing the electromagnetic radiation and for receiving the corresponding plurality of measured resonant transverse magnetic modes.

16. An apparatus as recited in claim 15, wherein the antenna is a single radiating element.

17. An apparatus as recited in claim 16, wherein the single radiating element comprises a whip antenna.

18. An apparatus as recited in claim 15, wherein:

the cavity comprises a substantially cylindrical shape and comprises a cavity axis that is coincident with a cylinder axis; and the antenna is configured to receive the corresponding plurality of measured resonant transverse magnetic modes at the cavity axis.

19. An apparatus as recited in claim 8, wherein the antenna system comprises:

a radiating element for directing the electromagnetic radiation; and a receiving element for receiving the corresponding plurality of measured resonant transverse magnetic modes.

20. An apparatus as recited in claim 19, wherein the receiving element comprises a whip antenna.

21. An apparatus as recited in claim 19, wherein:

the cavity comprises a substantially cylindrical shape and comprises a cavity axis that is coincident with a cylinder axis; and the receiving element is configured to receive the plurality of measured resonant transverse magnetic modes at the cavity axis.

22. An apparatus as recited in claim 19, wherein:

the radiating element has a radiating element axis;

the receiving element has a receiving element axis; and the radiating element axis is located substantially orthogonally with respect to the receiving element axis.

23. An apparatus as recited in claim 8, wherein:

the shape of the cavity is substantially cylindrical and the cavity comprises a side wall, an end face, and a cylindrical axis extending through the end face;

the radiating element is disposed in the side wall of the cavity; and the receiving element is disposed in the end face substantially at the cylindrical axis.

24. An apparatus as recited in claim 8, wherein:

the antenna system is positioned with respect to the cavity to receive azimuthally symmetric ones of the plurality of measured resonant transverse magnetic modes; and the signal processor comprises circuitry for processing the azimuthally symmetric ones of the plurality of measured resonant transverse magnetic modes.

25. An apparatus as recited in claim 8, wherein:

each of the measured resonant transverse magnetic modes comprises a resonant frequency;

the plurality of measured resonant transverse magnetic modes comprise sequential ones of the measured resonant transverse magnetic modes, the sequential ones of the measured resonant transverse magnetic modes increasing as a function of an increase in the resonant frequency of the sequential ones of the measured resonant transverse magnetic modes; and the signal processor comprises circuitry for processing a first set of the sequential ones of the measured resonant transverse magnetic modes for measuring the dielectric constant value, the first set of measured resonant transverse magnetic modes comprising a lowest range of the sequential ones of the measured resonant transverse magnetic modes.

26. An apparatus as recited in claim 25, wherein:

the lowest range comprises the four lowest sequential ones of the measured resonant transverse magnetic modes.

* * * * *